(12) United States Patent
Chitrakar et al.

(10) Patent No.: US 12,232,182 B2
(45) Date of Patent: *Feb. 18, 2025

(54) APPARATUS AND METHOD FOR PRIORITIZATION OF RANDOM ACCESS IN A MULTI-USER WIRELESS COMMUNICATION SYSTEM

(71) Applicant: Panasonic Intellectual Property Management Co., Ltd., Osaka (JP)

(72) Inventors: Rojan Chitrakar, Singapore (SG); Yoshio Urabe, Nara (JP); Lei Huang, Singapore (SG); Michael Hong Cheng Sim, Singapore (SG)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/622,529

(22) Filed: Mar. 29, 2024

(65) Prior Publication Data

US 2024/0244671 A1    Jul. 18, 2024

Related U.S. Application Data

(63) Continuation of application No. 18/326,872, filed on May 31, 2023, now Pat. No. 11,974,330, which is a (Continued)

(30) Foreign Application Priority Data

Mar. 4, 2016   (JP) ................. 2016-042036

(51) Int. Cl.
*H04W 74/0833*   (2024.01)
*H04L 5/00*   (2006.01)
(Continued)

(52) U.S. Cl.
CPC ....... *H04W 74/0833* (2013.01); *H04L 5/0058* (2013.01); *H04L 5/0092* (2013.01);
(Continued)

(58) Field of Classification Search
CPC ............... H04W 74/00; H04W 74/006; H04W 74/008; H04W 74/08; H04W 74/0833;
(Continued)

(56) References Cited

U.S. PATENT DOCUMENTS 10,154,520 B1    12/2018    Hedayat et al.
10,368,358 B2    7/2019    Adachi et al.
(Continued)

FOREIGN PATENT DOCUMENTS

WO    WO 2016028117 A1    2/2016
WO    WO 2016028131 A1    2/2016
(Continued)

OTHER PUBLICATIONS

Ahn et al., "Random access based buffer status report," IEEE 802.11-15/1369r1, Nov. 12, 2015. (10 pages).
(Continued)

*Primary Examiner* — Warner Wong
(74) *Attorney, Agent, or Firm* — Seed IP Law Group LLP

(57) ABSTRACT

The present disclosure relates to the prioritization of devices taking part in a multi-user random access wireless communication. Based on some known conditions, devices that comply with the conditions are given preferential treatment during the random access period. The preferential treatment may refer to the eligible devices being allowed to access more resource units during the random access, or it may also mean faster access to the medium during the random access. By taking advantage of the methods described in the present disclosure, it is possible to assign higher priority to selected
(Continued)

frame types and/or device categories in a multi-user random access wireless communication system.

7 Claims, 22 Drawing Sheets

Related U.S. Application Data continuation of application No. 17/394,888, filed on Aug. 5, 2021, now Pat. No. 11,706,815, which is a continuation of application No. 16/750,345, filed on Jan. 23, 2020, now Pat. No. 11,129,207, which is a continuation of application No. 16/029,164, filed on Jul. 6, 2018, now Pat. No. 10,582,542, which is a continuation of application No. PCT/JP2017/003280, filed on Jan. 31, 2017.

(51) Int. Cl.
*H04L 27/26* (2006.01)
*H04W 28/02* (2009.01)
*H04W 72/21* (2023.01)
*H04W 72/566* (2023.01)
*H04L 12/18* (2006.01)
*H04L 12/40* (2006.01)
*H04L 47/6275* (2022.01)
*H04L 51/226* (2022.01)
*H04W 72/0446* (2023.01)

(52) U.S. Cl.
CPC ......... *H04L 27/26* (2013.01); *H04W 28/0278* (2013.01); *H04W 72/21* (2023.01); *H04W 72/566* (2023.01); *H04W 72/569* (2023.01); *H04W 74/0841* (2013.01); *H04L 5/0007* (2013.01); *H04L 12/1822* (2013.01); *H04L 12/40071* (2013.01); *H04L 47/6275* (2013.01); *H04L 51/226* (2022.05); *H04W 72/0446* (2013.01)

(58) Field of Classification Search
CPC ......... H04W 74/0841; H04W 72/1242; H04W 72/1284; H04W 72/0446; H04W 72/1247; H04W 72/04; H04W 72/00; H04W 28/0278; H04L 2012/6454; H04L 2012/5629; H04L 2012/5631; H04L 2012/6445; H04L 12/1822; H04L 12/40143; H04L 12/40071; H04L 29/08954; H04L 47/00; H04L 47/20; H04L 47/2433; H04L 47/6275; H04L 47/6295; H04L 47/70–821; H04L 5/0058; H04L 67/322; H04L 51/26; H04L 47/28; H04L 47/805
See application file for complete search history.

(56) References Cited

U.S. PATENT DOCUMENTS

| | | |
|---|---|---|
| 11,006,461 B2 | 5/2021 | Huang et al. |
| 2006/0251030 A1 | 11/2006 | Anderson et al. |
| 2011/0216700 A1 | 9/2011 | Moon et al. |
| 2016/0165574 A1 | 6/2016 | Chu et al. |
| 2016/0242070 A1 | 8/2016 | Asterjadhi et al. |
| 2016/0309508 A1 | 10/2016 | Li et al. |
| 2016/0323879 A1 | 11/2016 | Ghosh et al. |
| 2017/0041953 A1 | 2/2017 | Zhou et al. |
| 2017/0208625 A1 | 7/2017 | Choi et al. |
| 2017/0272138 A1 | 9/2017 | Chun et al. |
| 2017/0273140 A1 | 9/2017 | Ryu et al. |
| 2017/0289994 A1 | 10/2017 | Kim et al. |
| 2017/0339692 A1 | 11/2017 | Chun et al. |
| 2017/0374684 A1 | 12/2017 | Ghosh et al. |
| 2018/0184425 A1 | 6/2018 | Ghosh et al. |
| 2018/0213566 A1 | 7/2018 | Baron et al. |
| 2018/0220357 A1 | 8/2018 | Kim et al. |
| 2018/0220437 A1 | 8/2018 | Li et al. |
| 2018/0242355 A1 | 8/2018 | Lou et al. |
| 2018/0263047 A1 | 9/2018 | Kim et al. |
| 2018/0310229 A1 | 10/2018 | Li et al. |
| 2020/0163127 A1 | 5/2020 | Chitrakar et al. |
| 2021/0368497 A1 | 11/2021 | Nezou et al. |
| 2023/0362997 A1 | 11/2023 | Vaidya et al. |

FOREIGN PATENT DOCUMENTS

| | | |
|---|---|---|
| WO | WO 2016177089 A1 | 11/2016 |
| WO | WO 2017024568 A1 | 2/2017 |

OTHER PUBLICATIONS

Colombian Examiner's Opinion dated May 8, 2019 for the related Colombian Patent Application No. NC2018/0007137. (6 pages).
English Translation of Chinese Office Action dated Jun. 11, 2021 for the related Chinese Patent Application No. 201780009789.9. (9 pages).
Fang et al., "UL MU Random Access analysis," IEEE 802.11-15/0843r1, Jul. 13, 2015. (20 pages).
Ghosh et al., "UL OFDMA-based Random Access Procedure," IEEE 802.11-15/1105r0, Sep. 14, 2015. (19 pages).
IEEE Std 802.11 (TM)—2012, IEEE Standard for Information technology—Telecommunications and information exchange between systems Local and metropolitan area networks—Specific requirements Part 11: Wireless LAN Medium Access Control (MAC) and Physical Layer (PHY) Specifications, Mar. 29, 2012. (2793 pages).
International Search Report of PCT application No. PCT/JP2017/003280 dated Mar. 7, 2017. (1 page).
Merlin et al., "Trigger Frame Content," IEEE 802.11-15/1344r1, Nov. 9, 2015. (19 pages).
NEC, "Trigger of enhanced coverage mode," R2-140513, Agenda Item: 7.9.2, 3GPP TSG RAN2 Meeting #85, Prague, Czech Republic, Feb. 10-14, 2014. (3 pages).
Patil et al., "CIDs related to Random Access," IEEE 802.11-17/1276r0, Aug. 29, 2017. (13 pages).
Stacey et al., "Proposed TGax draft specification," IEEE 802.11-16/0024r0, Jan. 15, 2016. (147 pages).
Stacey, "Specification Framework for TGax," IEEE 802.11-15/0132r14, Jan. 21, 2016. (43 pages).
Stacey, "Specification Framework for TGax," IEEE 802.11-15/0132r15, Jan. 28, 2016. (43 pages).
Ahn et al., "Congestion control for UL MU random access," doc.: IEEE 802.11-16/0085r1, Jan. 2016, 15 pages.
Indian Examination Report Jan. 31, 2024 for the correspoonding Indian Patent Application No. 202148047116, 7 pages.
Stacey et al., "Proposed TGax draft specification," doc.: IEEE 802.11-16/0024r1, IEEE P802.11 Wireless LANs, Mar. 2016, 160 pages.

FIG. 7A

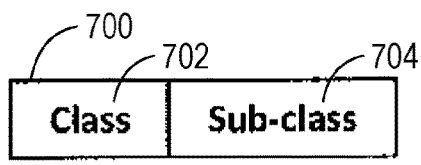

FIG. 7B

| CLASS VALUE B0 | CLASS DESCRIPTION | SUB-CLASS VALUE B3 B2 B1 | SUB-CLASS DESCRIPTION |
|---|---|---|---|
| 0 | Frame Type | 000 | Association Request |
| 0 | Frame Type | 001 | Authentication |
| 0 | Frame Type | 010 | BS Report |
| 0 | Frame Type | 011 | Probe Request |
| 0 | Frame Type | 100 | PS-Poll |
| 0 | Frame Type | 101 | Data |
| 0 | Frame Type | 110 | NO RESTRICTIONS ⟵712 |
| 0 | Frame Type | 111 | Reserved |
| 1 | AC or STA state/mode | 000 | AC_VO frames |
| 1 | AC or STA state/mode | 001 | AC_VI frames |
| 1 | AC or STA state/mode | 010 | AC_BE frames |
| 1 | AC or STA state/mode | 011 | Reserved ⟵714 |
| 1 | AC or STA state/mode | 100 | Power Save mode |
| 1 | AC or STA state/mode | 101 | Unassociated |
| 1 | AC or STA state/mode | 110 | Associated |
| 1 | AC or STA state/mode | 111 | Reserved |

FIG. 9

| TRIGGER TYPE B3 B2 B1 B0 | DESCRIPTION | |
|---|---|---|
| 0000 | Basic Trigger | |
| 0001 | Beamforming Report Poll Trigger | |
| 0010 | MU-BAR | |
| 0011 | MU-RTS | |
| 0100 | Trigger frame for random access (general use) | |
| 0101 | Trigger frame for random access (Buffer Status Report) | 902 |
| 0110 | Trigger frame for random access (PS-Poll) | 904 |
| 0111 | Trigger frame for random access (Association Request) | 906 |
| 1000 | Trigger frame for random access (Data) | 908 |
| 1001 | Trigger frame for random access (Power Save) | 910 |
| 1010 | Trigger frame for random access (Unassociated) | 912 |
| 1011 | reserved | |
| 1100 | reserved | |
| 1101 | reserved | |
| 1110 | reserved | |
| 1111 | reserved | |

FIG. 10A
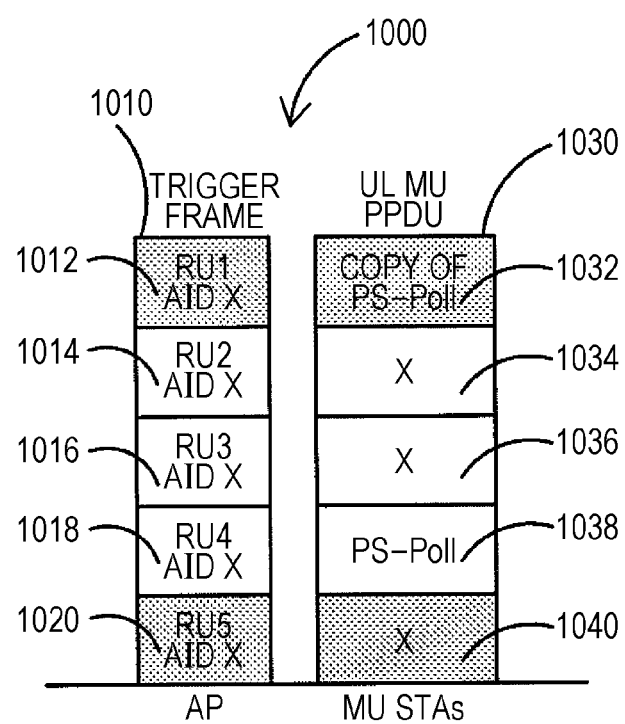
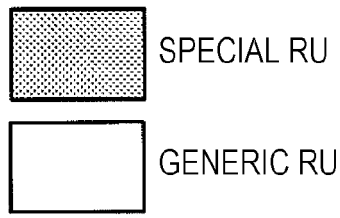

FIG. 10B

| CHANNEL CONDITION B3 B2 B1 B0 | DESCRIPTION |
|---|---|
| 0000 | SNR >= 25 dB |
| 0001 | 15 dB <= SNR < 25 dB |
| 0010 | 10 dB <= SNR < 15 dB |
| 0011 | SNR < 10 dB |
| 0100 | RSSI >= -40 dBm |
| 0101 | -50 dBm <= RSSI < -40 dBm |
| 0110 | -60 dBm <= RSSI < -50 dBm |
| 0111 | RSSI < -60 dBm |
| 1000 | Interference < -100 dBm |
| 1001 | -100 dBm <= Interference < -90 dBm |
| 1010 | -90 dBm <= Interference < -80 dBm |
| 1011 | Interference > -80 dBm |
| 1100 | reserved |
| 1101 | reserved |
| 1110 | reserved |
| 1111 | reserved |

FIG. 11B

| PRIORITY LEVEL | FRAME TYPE/S (STA ASSOCIATION STATE/POWER MANAGEMENT MODE) |
|---|---|
| HIGH PRIORITY | BS REPORT FRAME, PS-POLL FRAME, ALL FRAMES FROM AC_VO QUEUE (POWER SAVE MODE); AUTHENTICATION FRAME, (RE) ASSOCIATION REQUEST FRAME (UNASSOCIATED/DISASSOCIATED); COLLOCATED INTERFERENCE REPORT FRAME (ASSOCIATED) |
| NORMAL PRIORITY | BS REPORT FRAME, ALL FRAMES FROM AC_VO QUEUE (ACTIVE MODE); PROBE REQUEST FRAME (UNASSOCIATED/DISASSOCIATED); FRAMES FROM AC_VI QUEUES (POWER SAVE MODE); |
| LOW PRIORITY | ALL OTHER FRAME TYPES (ALL OTHER STATES) |

| PRIORITY LEVEL | $OCW_{min}$ | $OCW_{max}$ | TRANSMISSION PROBABILITY (PTX) |
|---|---|---|---|
| HIGH PRIORITY | 4 | 32 | 1 |
| NORMAL PRIORITY | 8 | 64 | 0.8 |
| LOW PRIORITY | 16 | 128 | 0.5 |

1180, 1182, 1184, 1186

FIG. 12
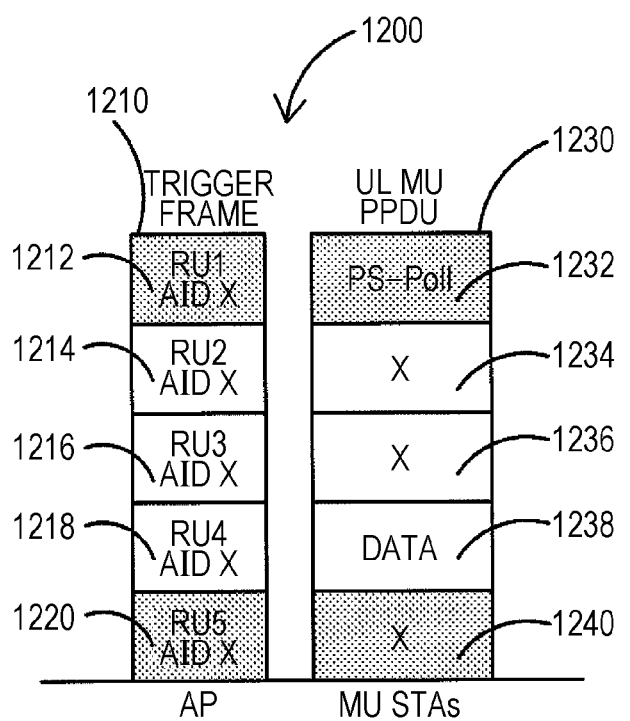
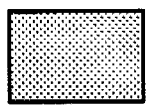 SPECIAL RU
("RESPONSE PREFERENCE" = "0100")
 GENERIC RU

APPARATUS AND METHOD FOR PRIORITIZATION OF RANDOM ACCESS IN A MULTI-USER WIRELESS COMMUNICATION SYSTEM

BACKGROUND

1. Technical Field

The present disclosure is generally related to an apparatus and a method of prioritizing random access in a multi-user wireless communication system.

2. Description of the Related Art

IEEE (Institute of Electrical and Electronics Engineers) 802.11 Working group is currently in the process of standardizing the next generation WLAN (Wireless Local Area Network) technology under the 802.11ax Task Group. The primary goal of the Task Group is the improvement of spectrum efficiency to enhance the system throughput/area in high density scenarios of access points (also called as "APs") and/or terminal apparatuses (also called as "STAs"). Among the various technologies being proposed, Orthogonal Frequency-Division Multiple Access (OFDMA) and uplink multi-user transmission are two key technologies that 802.11ax Task Group has adopted to achieve the throughput improvement goals.

In the past, 802.11 STAs operated on a 20 MHz channel bandwidth granularity, i.e., the smallest unit of channel bandwidth that a 802.11 STA could operate on was 20 MHz. But with the adoption of OFDMA, 802.11ax STAs, also known as High Efficiency (HE) STAs, can operate on sub-20 MHz channels. This means that several HE STAs can simultaneously transmit data on different sub-channels within the same 20 MHz channel. However, certain conditions have been imposed on such multi-user OFDMA transmissions, such as: all STAs taking part in a multi-user OFDMA transmission need to synchronize their transmissions to start at the same time point and to end at the same time point as well. Since the STAs are not aware of each other's transmission timings, this necessitates that the central controller, which is an Access Point (AP) in the case of WLANs, control the timings of the multi-user transmissions.

In 802.11ax, this is achieved by an AP that transmits a special control frame called a Trigger frame. The Trigger frame carries information such as the identity information of each of the STAs that may take part in the multi-user transmission, the transmission duration, the sub-channel (known as Resource Units, RU) allocation for each STA and other necessary information. STAs that are indicated in the Trigger frame transmit their respective frames on the allocated RU after a fixed interval of time (SIFS) since the end of the Trigger frame. This arrangement works fine when the AP has enough information regarding the STAs taking part in the multi-user transmission such as buffer status, STA operating state etc. But, there are cases where the AP may not have adequate information about the STAs to perform the necessary RU allocation in an efficient manner. In such cases, it is beneficial to allocate RUs to a group of STAs with similar characteristic and let the group of STAs contend for the RUs based on their actual needs. To meet such needs, the Uplink OFDMA Random Access procedure has been introduced in 802.11ax, hereon referred to as "UORA". Details of UORA is found in IEEE802.11-15/1105r0, UL OFDMA-based Random Access Procedure and in section 9.58.2.5.1 of IEEE802.11-16/0024r0, Proposed TGax draft specification. See, for example, IEEE Std 802.11-2012.

SUMMARY

However, there is no support in IEEE802.11-15/0132r14, Specification Framework for TGax, January 2016, IEEE802.11-15/1105r0, UL OFDMA-based Random Access Procedure, and IEEE802.11-16/0024r0, Proposed TGax draft specification for resource prioritization for random access based on the STA's traffic types, buffer loads or other device properties. Method of assigning higher priority to selected frame types and/or STA categories during the UL OFDMA Random Access is required.

In one general aspect, the techniques disclosed here feature a random access method for a wireless station in a multi-user wireless communication system, the method comprising: (a) receiving a trigger signal transmitted by a wireless access point, wherein the trigger signal specifies a condition for the frequency resources allocated by the trigger signal; (b) contending for access to the wireless medium; and (c) when the wireless station wins the random access contention, determining whether the wireless station fulfills the condition specified in the trigger signal; (d) when the wireless station fulfills the condition, concurrently transmitting a plurality of frames on a plurality of frequency resources; and (e) when the wireless station does not fulfill the condition, transmitting a single frame on a randomly chosen frequency resource without the said condition restriction; wherein the said condition specifies a recommended usage for the frequency resources.

By taking advantage of the methods described in the present disclosure, it is possible to facilitate assigning higher priority to selected frame types and/or STA categories during the Uplink OFDMA Random Access.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 7A illustrates an example of a "response preference" field in the Common Info field of the Trigger frame according to the first embodiment;

FIG. 7B is an example of the bit encoding used in the Trigger frame to represent the response preference according to the first embodiment;

FIG. 9 is a diagram of a second embodiment of the bit encoding used to represent the Trigger types;

FIG. 10A is a diagram of another example multi-user frame exchange as per a third embodiment of the proposed prioritized multi-user random access;

FIG. 10B illustrates the corresponding bit encoding for channel conditions;

FIG. 11B is an example Priority Table for various UORAFs;

FIG. 11C is another example Channel Access Parameters for various UORAFs;

FIG. 12 is a diagram of an example multi-user frame exchange as per the fourth embodiment of the proposed prioritized multi-user random access;

DETAILED DESCRIPTION

The present disclosure can be better understood with the aid of following figures and embodiments. The embodiments described here are merely exemplary in nature and are used to describe some of the possible applications and uses of the present disclosure and should not be taken as limiting the present disclosure with regard to alternative embodiments that are not explicitly described herein.

In any wireless communication system, a wide variety of devices may be a part of the wireless network, each device differing in terms of traffic needs, device capabilities, power supply types and so on. Some class of devices may have high bandwidth requirements, high QoS requirements in terms of latency or transmission success rate etc. but may not be very concerned about power consumption since they may be main-powered or have large batteries (for example, Laptop computers). While another class of devices may have less bandwidth requirements and also less stringent QoS requirements but may be relatively more concerned about power consumption (for example, mobile phones). Yet another class of devices may have low bandwidth requirements as well as very low duty cycles but may be very sensitive to power consumption due to extremely small batteries or extremely long life expectancy (for example, sensors for remote sensing etc.).

In many wireless communication systems, there will be one or more central controllers (for example, APs) which will determine the wireless network coverage area, the wireless frequency channels, the device admission policy, coordination with other neighboring wireless networks etc. and usually also act as a gateway to the backend infrastructure network. Examples of the central controllers are the Base Stations or eNBs in cellular wireless networks or the Access Points (AP) in WLANs etc.

Even though the techniques described in the present disclosure may apply to many wireless communication systems, for the sake of example, the rest of the descriptions in this disclosure are described in terms of an IEEE 802.11 WLAN system and its associated terminologies. This should not be taken as limiting the present disclosure with regard to alternative wireless communication systems. In IEEE 802.11 based WLANs, majority of networks operate in Infrastructure mode, i.e. all or most of the traffic in the network need to go through the AP. As such, any device (called STA in 802.11 terms) wishing to join the WLAN must first negotiate the network membership with the AP through a process called Association. Prior to Association, most WLANs also require some sort of Authentication, for example, WPA etc.

Device Class

Figure 1:
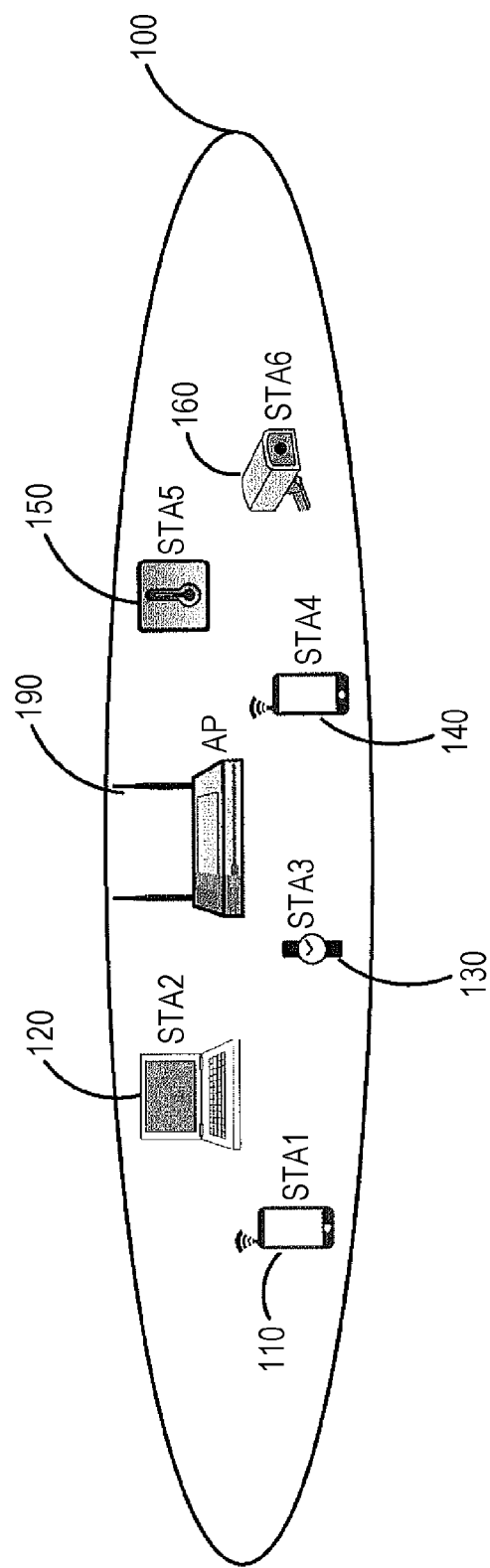
FIG. 1 is a diagram of a particular embodiment of a system that makes use of the prioritized multi-user random access.

Referring to FIG. 1, an example wireless network 100 may include an AP 190 and many associated STAs. STA2 120 and STA6 160 represent a device class with high bandwidth and possibly high QoS requirements and relatively low requirement for power saving. STA1 110 and STA4 140 represent another device class that may also have high bandwidth and possibly high QoS requirements but are relatively more concerned about power consumptions. On the other extreme, STA3 130 and STA5 150 represent another class of devices that may have low bandwidth requirements but may be very sensitive to power consumption.

Uplink OFDMA Random Access

In general, the channel access mechanism in a wireless system may be either centrally coordinated by a central controller (for example, HCCA in 802.11) or it may be based on a distributed access mechanism such as CSMA/CA. Recently, in the ongoing IEEE 802.11ax Task Group, a mixed kind of channel access mechanism, called Uplink OFDMA Random Access (UORA), has been introduced. An HE (High Efficiency) STA that uses the random access procedure maintains an internal counter termed as OFDMA Backoff (OBO) counter. The OFDMA contention window (OCW) is an integer with an initial value of OCWmin. A 802.11ax AP (also called as HE AP) reports to STAs the value of OCWmin for the random access operation. For an initial UL Physical Layer Protocol Data Unit (PPDU) transmission, when a STA obtains the value of OCWmin from the HE AP, it sets the value of OCW to the OCWmin and initializes its OBO counter to a random value in the range of 0 and OCWmin.

Figure 2:
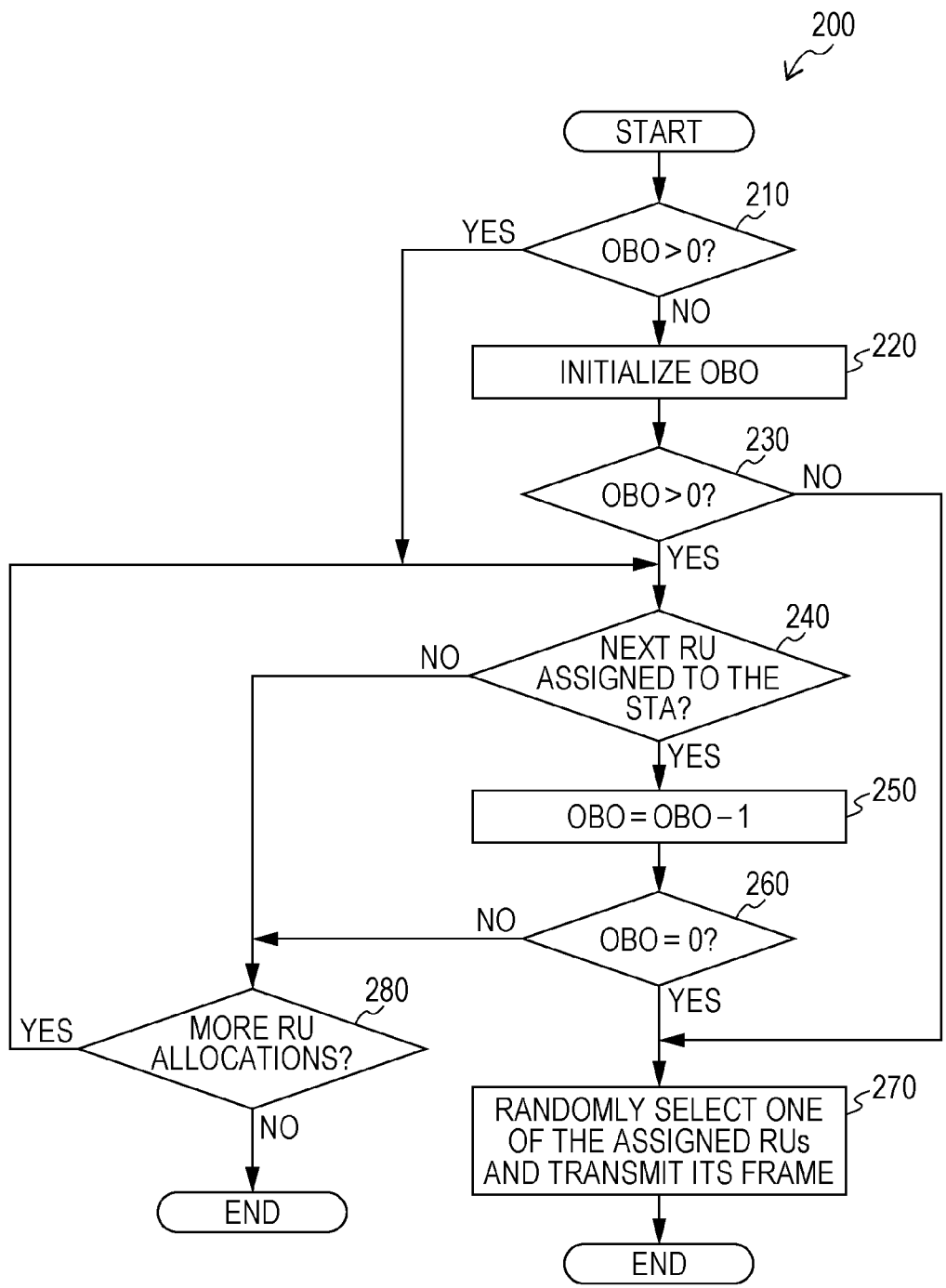
FIG. 2 is a flow chart of the Uplink OFDMA Random Access procedure which serves as the background art for the present disclosure.

The UORA process at a STA can be better explained with the aid of flow chart 200 in FIG. 2. The UORA process starts when the STA receives a Trigger frame from an AP and determines that at least one RU has been allocated to the STA. If this is the first instance of the UORA process being invoked, or if the STA was successful in winning contention at the previous UORA period, its OBO will be equal to 0. At step 210, whether the OBO value is greater than 0 is determined. If the OBO value is greater than 0, the process directly jumps to step 240 but if OBO value is equal to 0, the process is passed to step 220 where the OBO is initialized to a random value between 0 and OCW and the process is passed to step 230. At step 230, whether the OBO value is greater than 0 is determined again. If the OBO value is greater than 0, the process is passed to step 240, but if OBO value is equal to 0, the process directly jumps to step 270.

At step 240, starting from the first RU allocation in the Trigger frame, it is checked if the RU is allocated to the STA. If it is, the process is passed to step 250 where OBO is decremented by 1 and the process is passed to step 260, else the process is passed to step 280. At step 260, whether the OBO value is 0 is determined. If the OBO value is 0, the process is passed to step 270, else the process is passed to step 280. At step 270, the STA is considered to have won contention rights, and it randomly selects one RU among the RUs allocated for the STA and transmits its frame on the selected RU and the UORA process ends. At step 280, the Trigger frame is checked if more RU allocation exist. If more RU allocation exist, the UORA process continues and the process jumps back to step 240, else the UORA process ends.

Figure 3:
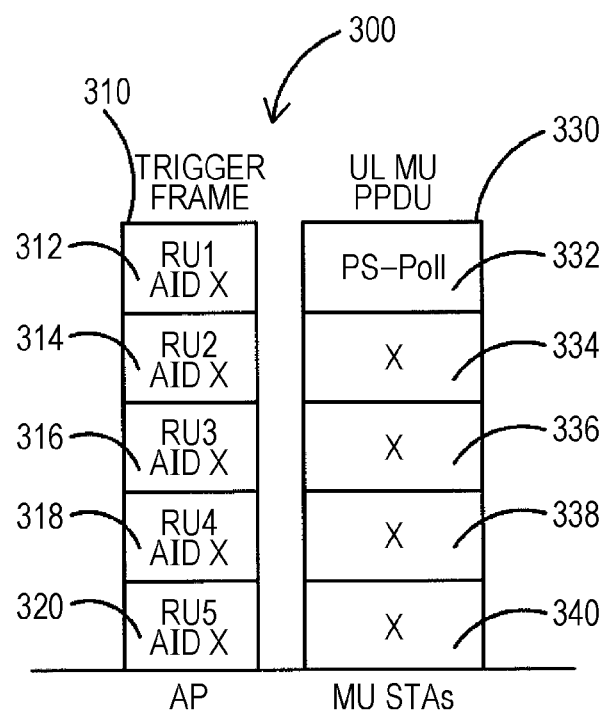
FIG. 3 is a diagram of an example multi-user frame exchange using the original Uplink OFDMA Random Access procedure.

Referring to FIG. 3, an example multi-user frame exchange 300 using the above explained UORA process is shown. The Trigger frame for random access 310 is transmitted by the AP 190 of FIG. 1 following a successful CMSA/CA contention. The Trigger frame contains five RU allocation fields 312, 314, 316, 318, and 320 for assigning RU1, RU2, RU3, RU4, and RU5 respectively to AID X which represents a group of STAs: STA1, STA2, and STA3. Since the Trigger frame has RU allocation fields for STA1, STA2, and STA3, each device's OBO value is randomly initialized, for example, to 10, 7, and 3 respectively. As per the UORA process 200 of FIG. 2, the OBO values of all three STAs are decremented by 1 in each of RU1, RU2, and RU3 allocation fields 312, 314, and 316. At RU3 allocation field 316, STA1's OBO value is equal to 7, STA2's OBO value is equal to 4 and STA3's OBO value is equal to 0. Since STA3 with its OBO value being 0 has won the contention, STA3 randomly selects RU1 332 and transmits its PS-Poll frame on it. As for STA1 and STA2, their OBO values continue to be decremented at RU4 and RU5, attaining values of 5 and 2 respectively at RU5 allocation field 320. Since both of STA1 and STA2 failed to have respective OBO values to have reached 0, neither of STA1 and STA2 managed to win contention in this Trigger frame and as a result, RU2 334, RU3 336, RU4 338, and RU5 340 are not used for the uplink PPDU. As this example shows, since one STA is only allowed to transmit its frame on only one RU, the channel utilization efficiency can be low in sparse networks.

Although UORA may be scheduled at any time point at the discretion of the AP, a most likely usage scenario is at times when the AP does not have a very precise knowledge, or has no knowledge at all of the STAs' uplink traffic needs. Some example cases are as follows:
1. STAs are running on Power Save mode and waking up after a long doze period.
2. Unassociated STAs are present.
3. STAs have not communicated with the AP for some time period.

In such cases, the AP does not have enough information to be able to schedule multi-user uplink OFDMA transmission in an efficient way. Specifically, the AP may not know the buffer status of the associated STAs or the presence of unassociated STAs that are not able to communicate with the AP. Under such circumstances, scheduling UORA can be beneficial but only if the Trigger frame can be targeted at such STAs. With the current UORA, the only way for the AP to provide differentiated service to the STAs is during the RU allocation.

Prioritization in Random Access in LTE

Besides 802.11ax, Uplink OFDMA Random Access is also used in other wireless communication systems such as 3GPP LTE etc. In LTE, Random Access is used by the UEs to request new channel resources from the eNB. Prioritization schemes have been proposed for the Random Access in LTE based on grouping the UE traffic according to their QoS requirements and pre-allocating different uplink channels (frequency resources) to different traffic classes. Priority may also be differentiated by utilizing class-dependent back-off procedures in the event of collision of the original random access attempt. The present disclosure differs from such schemes in a number of important aspects:
  Pre-assignment of resources is not required. Resources can be dynamically allocated by the central controller as per the need.
  There is no need to group devices into different classes.
  Higher priority is assigned by allowing higher priority devices to concurrently utilize more than one frequency resources as well as by differentiating the usage of such resources during the Random Access.

Figure 4:
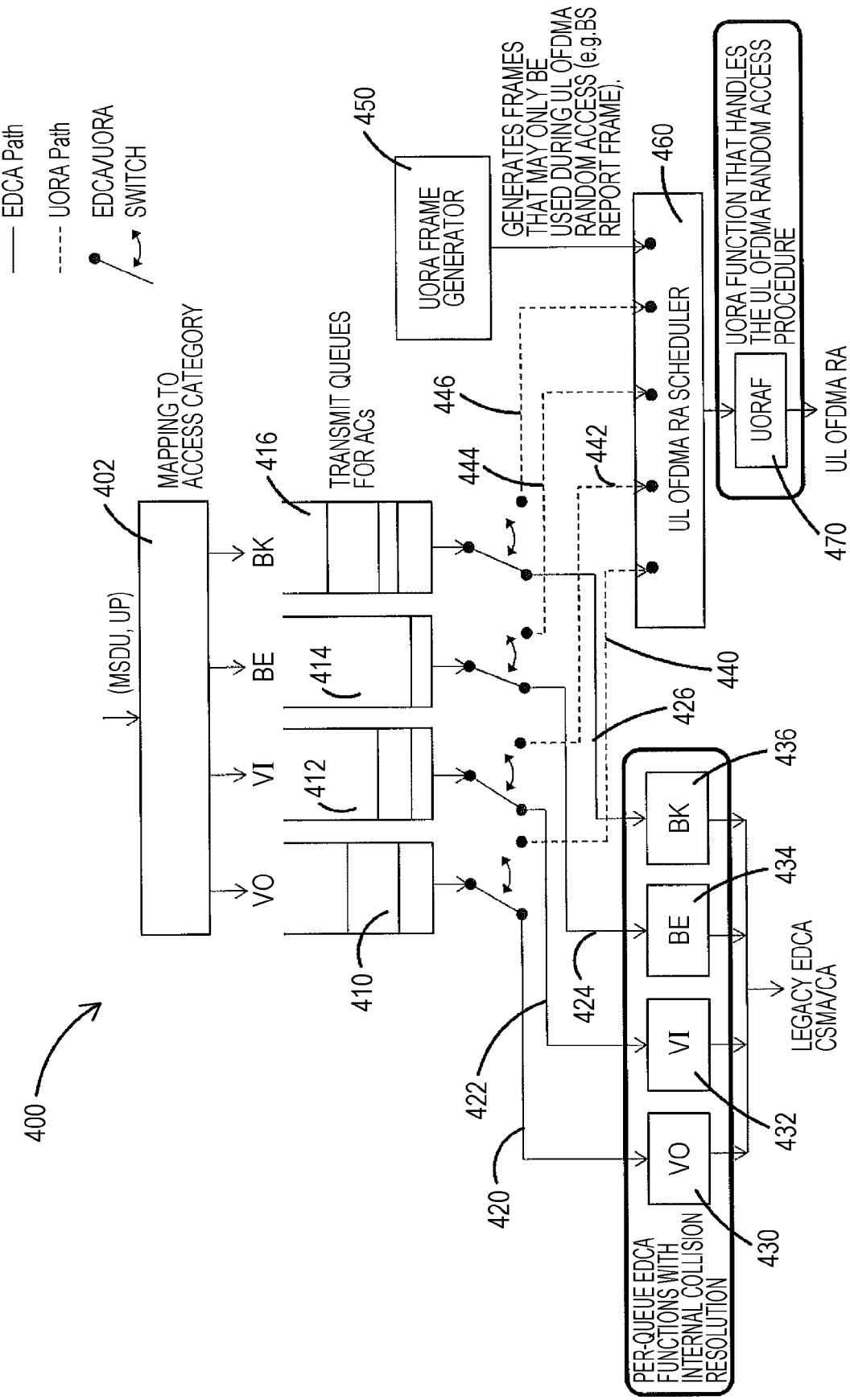
FIG. 4 is a diagram of a first embodiment of the transmit queue management used during the switch between EDCA and the Uplink OFDMA Random Access.

Before explaining the details of the present disclosure, it is necessary to briefly describe the relevant architecture of a transmitter device in which the present disclosure is implemented. Referring to FIG. 4, transmitter device 400 may represent a reference implementation model where the UORA is used in conjunction with the EDCA mechanism in an IEEE 802.11 WLAN STA. EDCA (Enhanced Distributed Channel Access), provides four prioritized queues for transmission, one queue each for a particular access category (AC). The four ACs, in increasing priority, are background (AC_BK), best-effort (AC_BE), video (AC_VI) and voice (AC_VO). The ACs and their respective transmission queues are used to differentiate the priority of the STA's frame during the CSMA/CA contention based channel access period. The EDCA parameters corresponding to the AC transmit queues are set in such a way that the higher priority queues have higher probability of winning the internal as well as external contention.

Circuitry 402 may represent a filter or a scheduler that screens the incoming frames from the upper layer applications based on the User Priority assigned to the frames and directs them to the respective transmit queues. Optionally, if management frame prioritizing schemes such as QMF are implemented, circuitry 402 may also be used to filter the MAC layer self generated management frames into the respective transmit queues. Here, 410, 412, 414, and 416 represent the transmit queues for AC_VO, AC_VI, AC_BE, and AC_BK respectively. During EDCA, each of the four transmit queues have their own corresponding EDCA functions (EDCAF) that independently contend for access to the wireless medium based on each queue's EDCA parameters. 430, 432, 434, and 436 represent the EDCA functions corresponding to the transmit queues for AC_VO, AC_VI, AC_BE, and AC_BK respectively while 420, 422, 424, and 426 represent the connections between the transmit queues and their respective EDCAFs. In the event that two or more EDCAFs win contention at the same, internal collision is said to have occurred and only the EDCAF corresponding to the AC with the highest priority will get to transmit while the other EDCAFs will invoke backoff procedure.

Based on the above knowledge, the inventors of this application have reached the present disclosure. Methods are disclosed that provide higher UORA priority to STAs that meet certain known conditions decided by the AP. Higher priority may refer to allowing the eligible devices to access a plurality of resource units (RUs) during the random access, or it may also mean faster access to the medium during the random access. According to one exemplary embodiment, the AP advertises in the Trigger frame, a recommended usage for selected RUs. STAs that win the UORA contention are allowed to concurrently transmit on multiple RUs if the STAs can meet the recommended usage condition, thereby leading to such STAs enjoying higher priority. According to another exemplary embodiment, the AP advertises in the Trigger frame, a certain channel condition under which qualifying STAs, upon winning the UORA contention, may concurrently transmit multiple copies of the same frame on multiple RUs thereby increasing their transmission success probability.

According to yet another exemplary embodiment, the rules for the UORA procedure are modified in such a way that STAs that meet the recommended usage conditions for selected RUs advertised by the AP in the Trigger frame, have an advantage in the UORA procedure leading to higher probability of them winning the random access contention. Several exemplary embodiments are described in detail in later sections to describe the disclosure in detail. The various embodiments for the prioritized multi-user random access proposed in the present disclosure are described in detail in the following sections.

First Embodiment

Referring again to FIG. 4, the reference implementation model that relates to UORA is described. As opposed to EDCA (Enhanced Distributed Channel Access), according to a first embodiment, the UORA procedure is handled by a single UORA function (UORAF) 470. In order to work seamlessly in conjunction with the EDCA reference implementation model, a switching mechanism is required which, upon being triggered by some specific course of action, for example, receipt of a valid Trigger frame, will switch the operation from EDCA to UORA and the control of the transmit queues are handed to UORAF via the connectors 440, 442, 444, and 446. During this switching process, various housekeeping procedure may be performed such as freezing the EDCA backoff procedures, backing up the various EDCA related counters etc.

At the same time, the UORA related counters may need to be restored or initialized. At the end of the uplink random access period, a reverse switching process has to be performed, from UORA to EDCA. During this reverse switching, the UORAF is frozen, the UORA counters backed up, the backed up EDCAF counters are restored and the control of the transmit queues are handed back to the EDCAFs. In order to select the frames to be forwarded to the UORAF for transmission during UORA, an UL OFDMA RA Scheduler 460 may be implemented. A separate UORA frame generator 450 may also be implemented that is responsible for generating time sensitive frames specifically to be used during UORA, for example, STA's Buffer Status Report frame.

Figure 5:
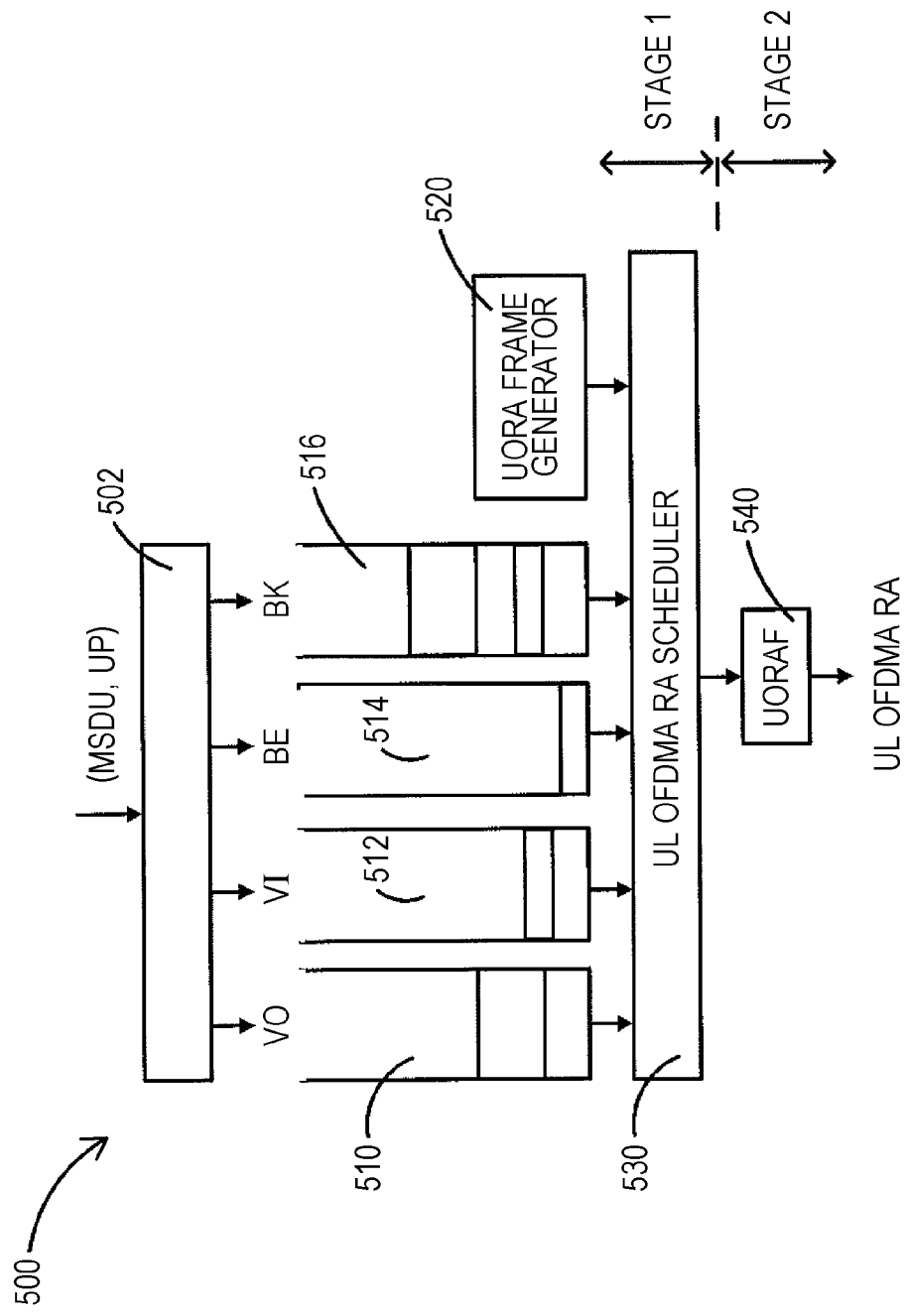
FIG. 5 is a diagram of the first embodiment of the transmit queue management used during the Uplink OFDMA Random Access.

FIG. 5 may be used to further illustrate the UORA reference implementation model 500. 502, 510, 512, 514, 516 are the same as 402, 410, 412, 414, and 416 of FIG. 4 respectively. Similarly, the UORA frame generator 520, the UL OFDMA RA Scheduler 530, and the UORAF 540 are the same as 450, 460, and 470 described in FIG. 4 respectively. Prioritization of frames during the uplink random access may be looked upon as taking place in two stages. In stage 1, the prioritization occurs within the STA itself and the competition is among the frames in the various transmit queues as well as other frames generated within the MAC itself. Stage 1 prioritization largely takes place within the scheduler 530.

As mentioned earlier, the role of the scheduler 530 is to select the frames to be forwarded to the UORAF 540 for transmission during UORA. Since frames may exist in more than one AC transmit queue and UORA specific frame may also be generated by the UORA frame generator 520, the scheduler may define some simple frame selection rules such as:

If a frame is generated by the UORA frame generator during the UORA, then the frame is selected, else If the Trigger frame indicates a specific "recommended usage" condition, for example, a "response preference", the first frame that is closest to the head of the AC transmit queue with the highest priority and which meets the "response preference" is selected, else If the Trigger frame does not indicate any specific "recommended usage" condition, the frame is selected according to its AC priority.

In addition, the scheduler 530 also needs to ensure that the size of the selected frame is appropriate for transmission within the allocated PPDU duration. Optionally the scheduler may also consider other factors during the frame selection process in stage 1, such as channel utilization efficiency in terms of the amount of padding required for the frame etc.

The stage 2 prioritization involves competition among the various STAs taking part in the uplink random access and is closely linked to the UORA procedure and the related channel access parameters. The UORAF is responsible for the stage 2 prioritization which is the main focus of the present disclosure.

Figure 6:
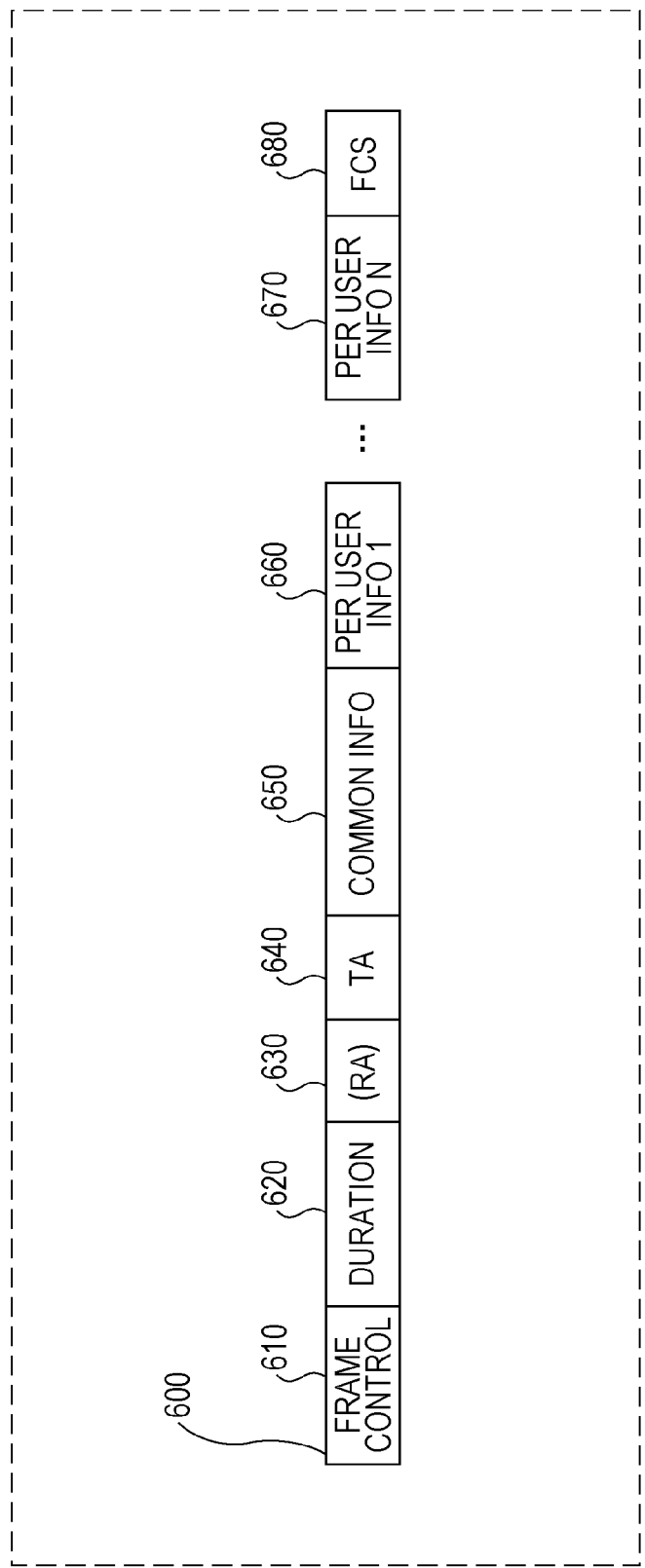
FIG. 6 is a diagram of a Trigger frame used to initiate the Uplink OFDMA Random Access.

Referring to FIG. 6, 600 represents the frame format of the generic Trigger frame that is used by the AP to assign RUs to STAs taking part in multi-user uplink transmission. The frame 600 is comprised of a Frame Control field 610 which indicate the frame properties such as frame type, sub-type etc., a Duration field 620, an optional receiver address field 630, a transmitter address field 640, a Common Info field 650 that indicates information regarding the response frame that is useful for all users, such as length, SIG-A contents, Trigger type etc., one or more Per User Info fields 660, . . . 670 which indicate information pertinent to a particular user such as MCS to be used for the response frame, RU allocation, Station ID etc., and finally the Frame Check Sequence (FCS) 680.

The Trigger frame for random access is a special sub-type of Trigger frame, and is identified as such either by the Trigger type sub-field in the Common Info field 650 or by defining special station IDs in the Per User Info fields 660, . . . 670 etc. If the first method is used, i.e. the Trigger frame is exclusively defined to be used for random access, all the RUs allocated in the Trigger frame are available for random access, whereas if the second method is used, only the RUs allocated in the respective Per User Info fields are allowed to be used for random access.

As proposed in the present disclosure, the AP advertises a pre-determined or known condition for RUs such that STAs that meet the condition are allowed to concurrently transmit more than one frame on a plurality of assigned RUs. The list of conditions may be defined in an Industry standard such as the IEEE 802.11ax and may be known to all compliant devices. It is also possible that the list of conditions may also be notified by the AP to the devices during the association process, or advertised regularly in periodic frames such as beacon frames. In the first embodiment, the condition may be referred to as a "response preference" and may be represented by 4 bits in the Common Info field 650 of the Trigger frame as shown in FIG. 7A.

The "response preference" field 700 in FIG. 7A may be further composed of a Class bit 702, and a 3 bits Sub-class field 704. As the name suggests, the Class bit indicates the general class of the response preferred by the AP. For example, if the Class bit is "0", the preferred response may refer to a particular frame type, where as if the Class bit is "1", the preferred response may refer to frames of a particular Access Category (AC) or frames from STAs that are in a particular Association state or a particular Power Management mode. The Sub-class field may indicate the specific response preferred by the AP. With these 4 bits, it is possible to indicate up to 16 different "response preferences".

The table 710 in FIG. 7B is one example of the "response preference" encoding. Some of the values may be unused and may be reserved for future expansion example 714 while some values may also be used to indicate no restrictions on the use of the particular RU example 712.

Figure 7C:
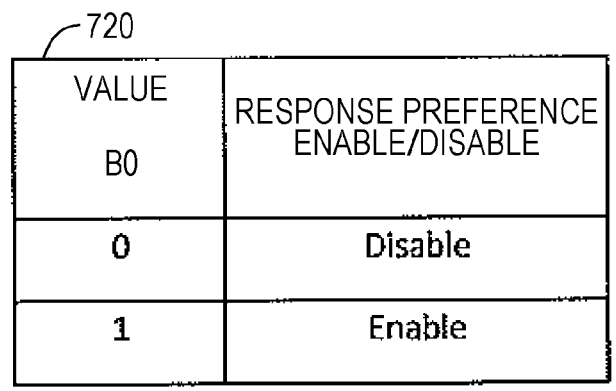
FIG. 7C is an example of a one bit flag in the Per User Info fields according to the first embodiment.

As shown in FIG. 7C, a one bit flag 720 in the Per User Info fields 660, . . . 670, referred to herein as a RPflag, may be used to indicate whether or not the indicated "response preference" applies to the RU allocated in that Per User Info field. If the RPflag is "0", the "response preference" does not apply to the RU but if the RPflag is "1", then it does. The RUs in which the indicated "response preference" criteria applies may be referred to as Special RUs, whereas the RUs in which the indicated "response preference" criteria does not apply may be referred to as Generic RUs.

Figure 7D:
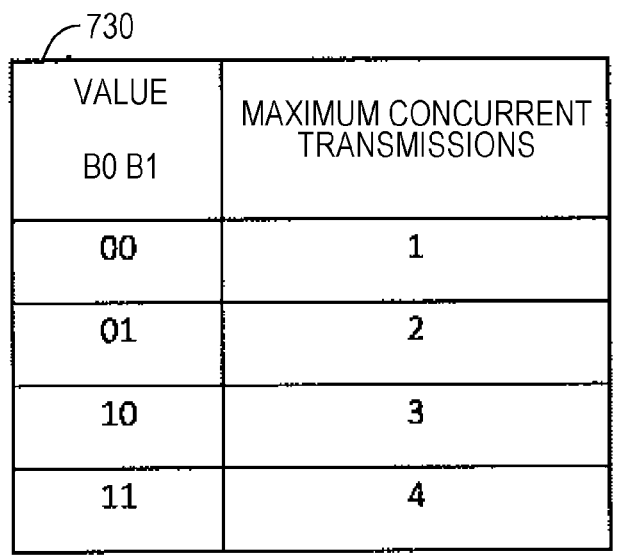
FIG. 7D is an example of two bits in the Common Info field to represent the maximum concurrent transmissions according to the first embodiment.

Similarly, the maximum number of frames that a STA is allowed to concurrently transmit may be represented by two bits in the Common Info field as shown in table 730 in FIG. 7D. The bit values "00", "01", "10", and "11" represent 1, 2, 3, and 4 maximum concurrent transmissions respectively. "00" may be used by the AP in special cases to explicitly disallow multiple concurrent transmissions.

As per the first embodiment, the AP indicates in the Common Info field of the Trigger frame, a "response preference" as well as the maximum number of frames that a STA is allowed to concurrently transmit. The AP further indicates the RUs in which the "response preference" applies by selectively setting the RPflag in the Per User Info fields to "1". A STA, upon receiving the Trigger frame, first checks if there is at least one RU allocated to the STA in the Trigger frame. If yes, the STA proceeds to contend for the wireless medium as per the UORA procedure. If the STA wins the UORA contention, it may transmit multiple frames, up to the number indicated by the maximum concurrent transmission sub-field 730 in FIG. 7D as per the following rules:

If the next frame to be transmitted meets the 'response preference' criteria, it may randomly choose any one RU (either Special RU or Generic RU) from the group of allocated RUs and transmit the frame.

If the next frame to be transmitted does not meet the 'response preference' criteria, it may randomly choose one RU only among the Generic RUs (i.e. RU with 'Response Preference' set to disable) to transmit the frame.

The process repeats until the STA has no more frames to transmit or it has transmitted the maximum number of frames allowed.

If the number of STAs contending for UORA is large, there is a possibility that more than one STA win the contention and subsequently transmit multiple frames on different RUs leading to increased chances of collision as compared to the original UORA. As such, the AP needs to strike a balance when choosing the appropriate value for the maximum concurrent transmission sub-field 730 such that the collision rate is within an acceptable limit.

Figure 8A:
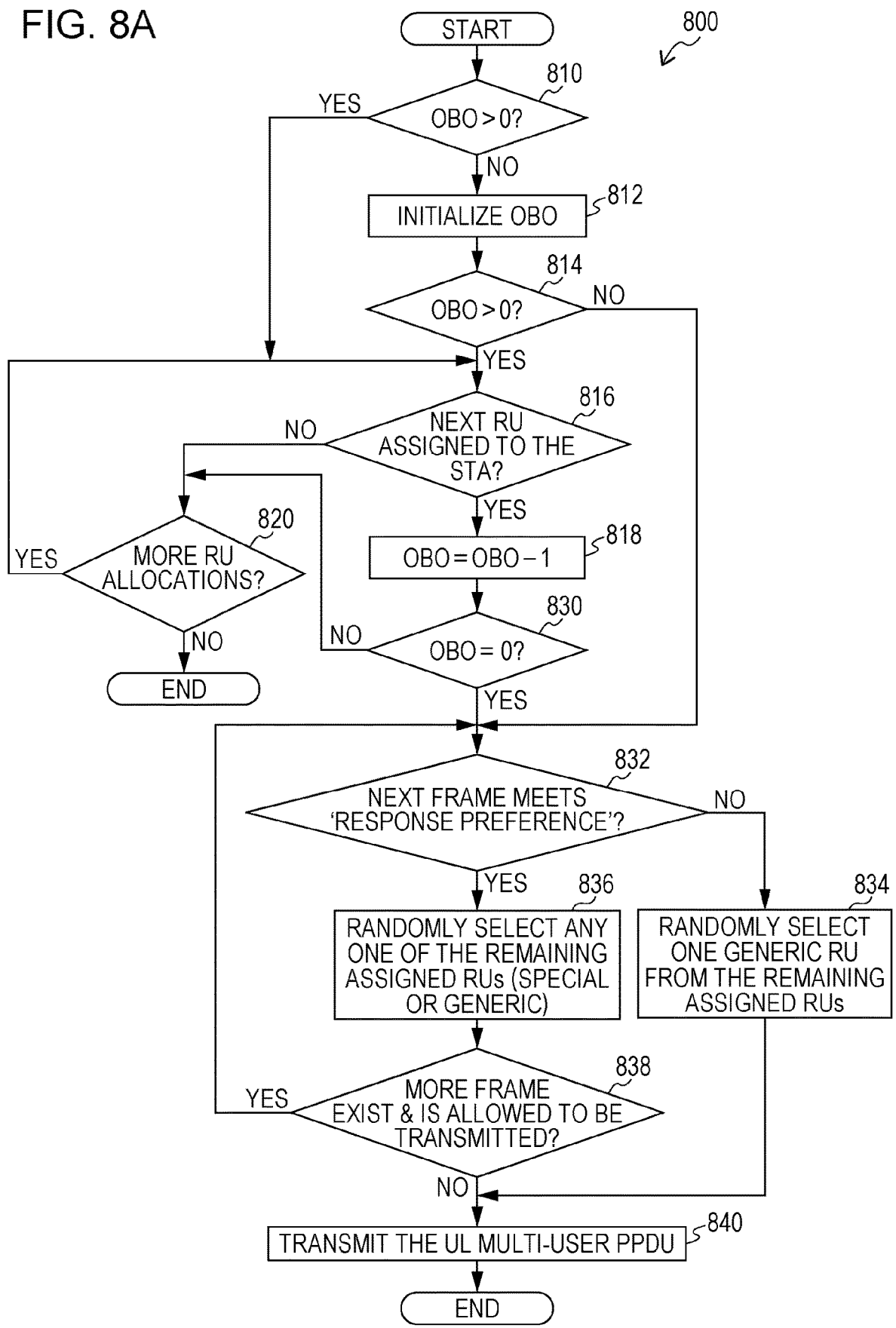
FIG. 8A is a flow chart of the proposed prioritized multi-user random access procedure according to the first embodiment.

The UORA process as per the first embodiment can be better explained with the aid of FIG. 8A and flow chart 800. The UORA process starts when the STA receives a Trigger frame from an AP and determines that at least one RU has been allocated to the STA. If this is the first instance of the UORA process being invoked, or if the STA was successful in winning contention at the previous UORA period, its OBO will be equal to 0. The value of OCW is initially set to OCWmin, which may be set to a default value or may be obtained from the AP. At step 810, whether the OBO value is greater than 0 is determined. If the OBO value is greater than 0, the process directly jumps to step 816 but if OBO value is equal to 0, the process is passed to step 812 where the OBO value is initialized to a random value between 0 and OCW and the process is passed to step 814.

At step 814, whether the OBO value is greater than 0 is determined again. Of the OBO value is greater than 0, the process is passed to step 816, but if OBO value is equal to 0, the process directly jumps to step 832. At step 816, starting from the first RU allocation field in the Trigger frame, it is checked if the RU is allocated to the STA. If it is, the process is passed to step 818 where OBO value is decremented by 1 and process is passed to step 830, else the process is passed to step 820. At step 830, whether the OBO value is 0 is determined. If the OBO value is 0, the process is passed to step 832, else the process is passed to step 820. At step 820, the Trigger frame is checked if more RU allocation field exist. If more RU allocation field exist, the UORA process continues and the process jumps back to step 816 else the UORA process ends.

At step 832, the STA is considered to have won contention rights, and the STA checks if it meets the "response preference" condition. If yes, process is passed to step 836, else process is passed to step 834 when the STA randomly selects one Generic RU from the list of remaining Generic RUs assigned to the STA and the UORA process is terminated and process is passed to step 840. At step 836, the STA randomly selects any one RU from the list of remaining Special or Generic RUs assigned to the STA and process is passed to step 838.

At step 838, the STA checks if there are more frames present in its transmit queue and also if the number of frames selected for transmission so far is less than the value specified by the maximum concurrent transmissions field 730. If the answer is yes for both conditions, the process is passed back to step 832, else the UORA process is terminated and process is passed to step 840. At step 840, the STA constructs the uplink multi-user PPDU with a common PHY header and the frames filling the data portions of the PPDU on the corresponding selected RUs and finally transmits the multi-user PPDU to the AP.

Figure 8B:
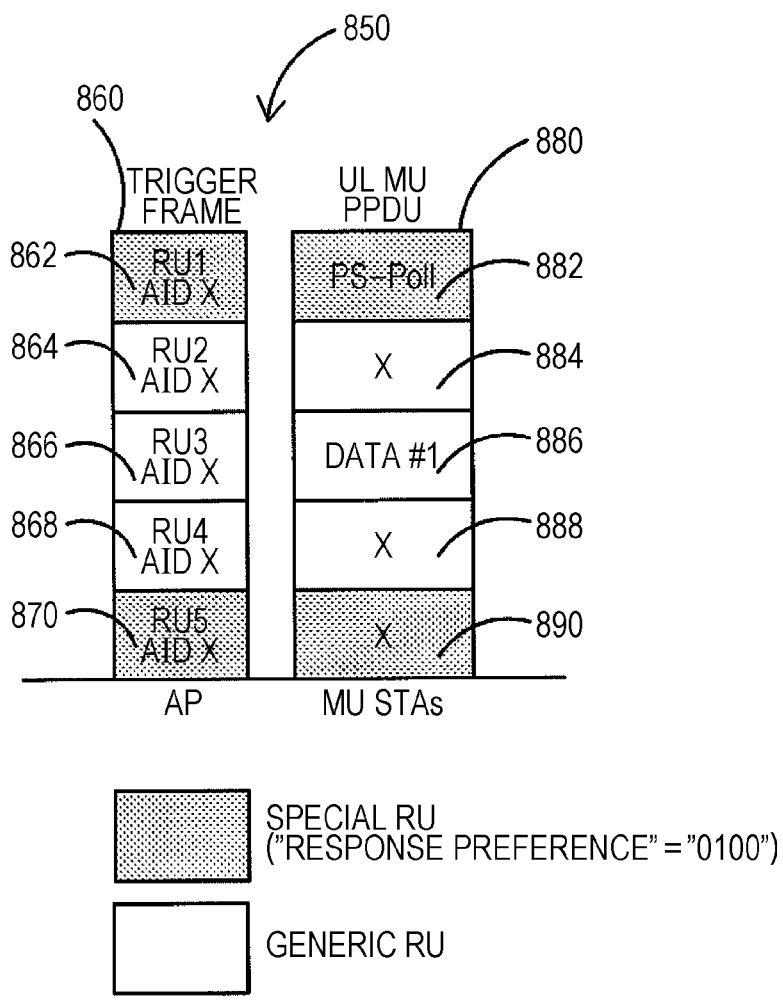
FIG. 8B is a diagram of an example multi-user frame exchange as per the first embodiment of the proposed prioritized multi-user random access.

In the example multi-user frame exchange 850 illustrated in FIG. 8B, the AP broadcasts a Trigger frame 860 which indicates RU1 862 and RU5 870 as Special RUs with a "response preference" of "0100" i.e. a PS-Poll frame, while RU2 864, RU3 866, and RU4 868 are Generic RUs. All the RUs are assigned to AID X which represents a group of STAs: STA1, STA2, and STA3. The maximum concurrent transmission sub-field 730 is set to "10" i.e. 3. Since the Trigger frame has RU allocation for all three STAs, STA1, STA2, and STA3, each device's OBO is randomly initialized to 10, 7, and 3 respectively. As per the UORA procedure 200, the OBOs of all three STAs get decremented by 1 in RU1, RU2, and RU3. At RU3, STA1's OBO is equal to 7, STA2's OBO is equal to 4 and STA3's OBO is equal to 0.

Since STA3 has won the contention, and STA3's next frame in the transmission queue happens to be a PS-Poll, STA3 is allowed to randomly choose any one RU from RU1 882, RU2 884, RU3 886, RU4 888 or RU5 890 for transmission in the multi-user PPDU 880. In the example, STA3 randomly chooses the Special RU, RU1 882 to transmit the PS-Poll frame. The next two frames in STA3's transmit queue happen to be data frames and since it does not qualify to be transmitted on the Special RUs, STA3 randomly chooses one of the Generic RUs, RU3 886 for transmission of the first data frame. Since a frame that does not meet the "response preference" is selected for transmission, even though the STA is allowed to transmit up to 3 frames, the UORA process has to be terminated.

Finally, STA3 constructs the uplink multi-user PPDU 880 with a common PHY header and the two frames filling the data portions of the PPDU, the PS-Poll frame on RU1, and the data frame on RU3 respectively and finally transmits the multi-user PPDU 880 to the AP. Assuming that STA1 and STA2 do not manage to win contention, it can be seen that as compared to the example in FIG. 3, since STA3 is allowed to transmit multiple frames on multiple RUs as per the present disclosure, STA3 enjoys a higher priority and at the same time, the channel utilization efficiency is also much higher.

Second Embodiment

According to a second embodiment of the disclosure, instead of signaling the condition as a "response preference" in the Common Info field 650 of the Trigger frame, the condition may be directly signaled by defining various types of Trigger frames, each specifying a particular usage for the RUs allocated by the Trigger frame. The various types of Trigger frames can be indicated by the Trigger type sub-field in the Common Info field 650 of the Trigger frame 600. This can be seen as an extension of the various Trigger frame types already being considered in the IEEE 802.11ax Task Group.

An example of the Trigger type representation using 4 bits is shown in Table 900 in FIG. 9. The first four Trigger types represent the special use Trigger frames already accepted to be a part of the IEEE 802.11ax specification. The fifth Trigger type, the Trigger frame for random access (general) represents a general use Trigger frame for random access with no specific restrictions or conditions. As per the present disclosure, the Trigger frame for random access may be further customized to indicate random access for specific response types. Some of these may be as follows:

Trigger frame for random access (Buffer Status Report) 902: solicits Buffer status report frames Trigger frame for random access (PS-Poll) 904: solicits PS-Poll frames Trigger frame for random access (Association Request) 906: solicits Association request frames Trigger frame for random access (Data) 908: solicits data frames Trigger frame for random access (Power Save) 910: solicits frames from STAs in Power Save mode Trigger frame for random access (Unassociated) 912: solicits frames from unassociated STAs.

Since the Trigger type restriction applies to all the RUs allocated by the Trigger frame, all the RUs in this case would be considered Special RUs and are restricted to be used by STAs whose frames meet the indicated response type. In cases where the AP may want to remove this restriction from some of the allocated RUs, or the AP wishes to specify a different response type for only some of the allocated RUs, it may do so by including the "response preference" field 700 in FIG. 7A, described earlier, in the Per User Info fields. The RUs allocated in the Per User Info fields that includes the "response preference" field would follow indicated the response preference instead of that specified by the Trigger type.

As an example, the AP may indicate the Trigger frame as being a Trigger type Trigger frame for random access (PS-Poll) and allocate three RUs, RU1, RU2, and RU3 in Per User Info 1 field, Per User Info 2 field, and Per User Info 3 field respectively to STA1, STA2, and STA3. The AP may also set the maximum concurrent transmission sub-field 730 in FIG. 7D, in the Common Info field to "01" i.e. 2. The AP may further include a "response preference" field with the value "0110" i.e. NO RESTRICTIONS in the Per User Info 3 field to indicate that RU3 is not restricted to PS-Poll frames. In this example, RU1 and RU2 would be considered Special RUs that only allow PS-Poll frames to be transmitted on them while RU3 would be considered a Generic RU and a STA winning contention may transmit any frame on it.

If STA1 wins the UORA contention, and it has a PS-Poll frame in its transmit queue, it randomly chooses RU1 from among RU1, RU2, and RU3 to transmit the PS-Poll frame. Since the maximum concurrent transmission sub-field is set to two, STA1 may proceed to transmit its next frame on the transmit queue, a data frame, on the Generic RU, RU3.

The second embodiment may be preferable as the signaling overhead would be lesser when there are many RUs to be allocated in the Trigger frame with the same condition.

Third Embodiment

According to a third embodiment of the present disclosure, instead of raising a STA's priority by allowing eligible STAs to transmit multiple frames, priority of the STA may be raised by allowing eligible STAs to transmit multiple copies of a same frame. STAs that are able to meet the condition indicated by the AP in the Trigger frame may be considered eligible STAs.

An example of the condition according to the third embodiment may refer to a particular channel condition. The AP advertises in the Trigger frame, a certain channel condition under which eligible STAs, upon winning the UORA contention, may concurrently transmit multiple copies of the same frame on multiple RUs thereby increasing their transmission success probability. For example, the channel condition may refer to a certain Signal to Noise Ratio (SNR) level of the Trigger frame observed by the receiving STA.

By setting the RPflag 720 in FIG. 7C in the Per User Info fields to "1", the AP may reserve some of the allocated RUs for STAs with the observed SNR value for the received Trigger frame that meets the condition indicated in the Common Info field 650 in FIG. 6 of the Trigger frame.

In the third embodiment, such reserved RUs may be referred to as Special RUs whereas the rest of the RUs may be considered as Generic RUs. Alternatively, the AP may also indicate the Special RUs by defining reserved Station IDs or AIDs to represent a particular channel condition. Other examples of channel conditions may be the Receiver Signal Strength Indicator (RSSI) of the received Trigger frame, or it may also be some level of interference experienced by the STA etc. In planning the RU allocation, the AP may also allocate the Special RUs far away from each other in the frequency domain so as to further increase the transmission success probability by taking advantage of frequency diversity.

An example encoding scheme for the channel condition is illustrated in Table 1050 in FIG. 10B. Four bits may be used to indicate various channel conditions. For example, "0000" 1052, "0001" 1054, "0010" 1056, and "0011" 1058 indicate channel conditions in terms of the SNR level of the Trigger frame received by a STA; "0100" 1060, "0101" 1062, "0110" 1064, and "0011" 1066 indicate channel conditions in terms of the RSSI level of the Trigger frame received by a STA while "1000" 1068, "1001" 1070, "1010" 1072, and "1011" 1074 indicate channel conditions in terms of the most recent values of the interference level experienced by a STA. The rest of the values are reserved for future use.

As an example, a multi-user random access frame sequence 1000 is illustrated in FIG. 10A. The AP, in the Trigger frame 1010, may allocate five RUs, RU1 1012, RU2 1014, RU3 1016, RU4 1018, and RU5 1020 in the Per User Info 1, Per User Info 2, Per User Info 3, Per User Info 4, and Per User Info 5 fields respectively to STA1, STA2, and STA3. The AP includes the Channel Condition sub-field in the Common Info field 650 and sets it to "0011" as in 1058 of FIG. 10B to indicate that the STAs which receive the Trigger frame at SNR level below 10 dB are allowed to transmit multiple copies of the same frame. The number of copies is limited to the number indicated by the maximum concurrent transmission sub-field 730 in FIG. 7D in the Common Info field, which is set to "01" i.e. 2 in this example. By setting the RPflags to "1" in the respective Per User Info fields, the AP further indicates that RU1 and RU5 may be used for multiple concurrent transmissions by the STAs that meet the indicated channel condition. The RPflags in the Per User Info fields of RU2, RU3, and RU4 are set to "0".

Here, RU1 and RU5 would be considered Special RUs while RU2, RU3, and RU4 would be considered Generic RUs. In this example, STA1 wins the UORA contention, and since the SNR level of the Trigger frame as observed by STA1 happens to be less than 10 dB and hence STA1 qualifies to transmit multiple copies of the same frame. STA1 has a PS-Poll frame as the next frame in its transmit queue, and it randomly chooses RU4 1038 from among RU1 1032, RU2 1034, RU3 1036, RU4 1038, and RU5 1040 to transmit the PS-Poll frame. Since the maximum concurrent transmission sub-field is set to two, STA1 is allowed to transmit one more copy of the PS-Poll and as such it proceeds to randomly choose RU1 1032 from among the two Special RUs, RU1 1032 and RU5 1040 to transmit the second copy of the PS-poll frame.

Another example of the condition according to the third embodiment may refer to a particular STA type, for example, a sensor type STA with extremely low duty cycle and very stringent power constraints. Since unsuccessful transmissions and subsequent re-transmissions can cause relatively large power wastage, it would be desirable to minimize transmission failure probability for such STAs. In order to ensure higher transmission reliability, the AP may reserve some RUs for exclusive use of such STAs and allow them to transmit multiple copies of the same frame.

The third embodiment may be preferable in situations where the AP is aware of the presence of member STAs that may benefit significantly through reduction of their transmission failure probabilities. By allowing such STAs to concurrently transmit multiple copies of the same frame on multiple RUs the AP may attempt to improve their transmission success probability. The present disclosure may be used to supplement other schemes for improving transmission success probability, such as adjusting the transmit MCS level, or transmit power level etc.

Fourth Embodiment

Figure 11A:
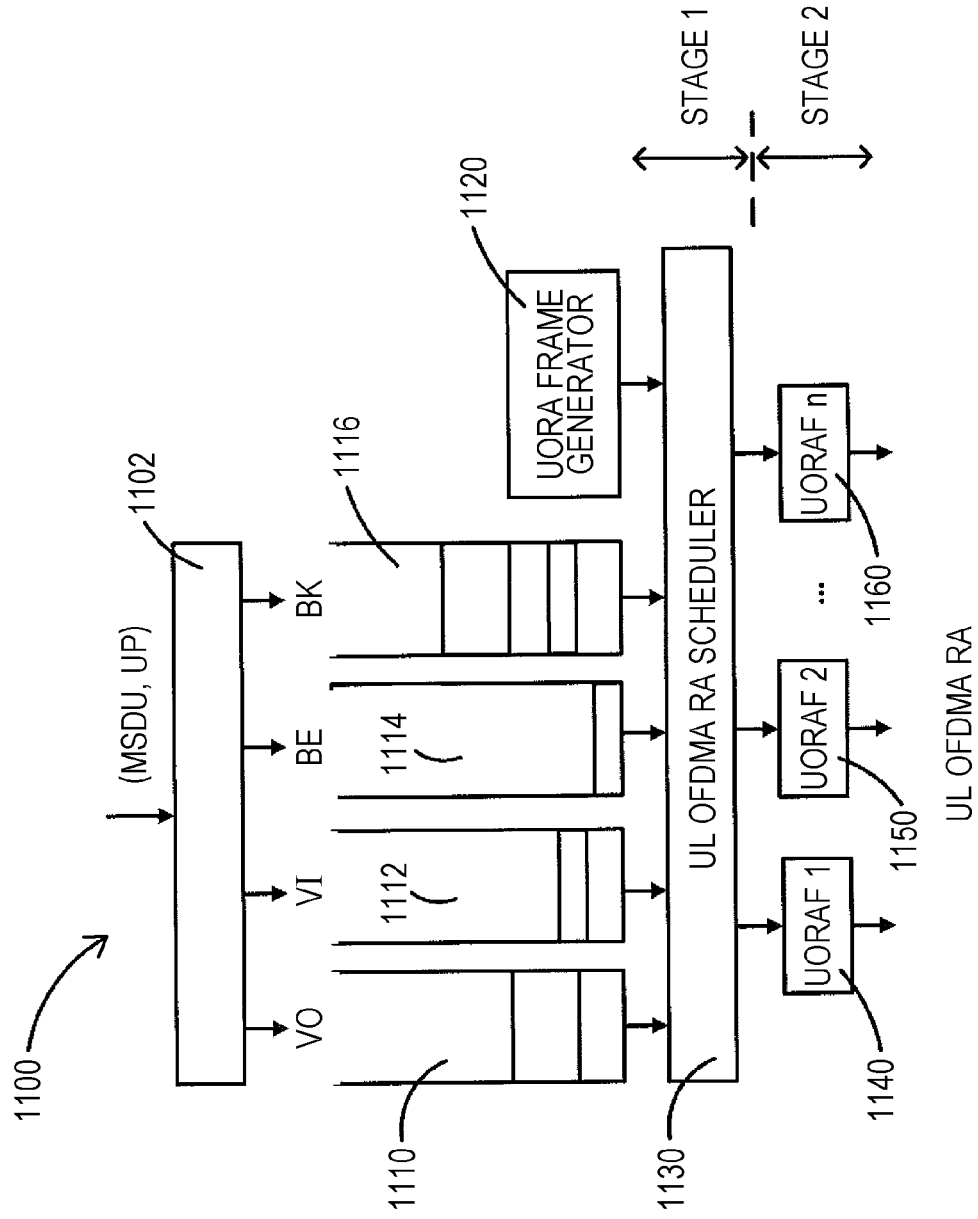
FIG. 11A is a diagram of the transmit queue management used during the Uplink OFDMA Random Access as per a fourth embodiment.

FIG. 11A may be used to illustrate the UORA reference implementation model 1100 for a fourth embodiment. The scheduler 1102 as well as the four transmit queues 1110, 1112, 1114, and 1116 are the same as the scheduler 502 and the transmit queues 510, 512, 514, and 516 of FIG. 5 respectively. Similarly, the UORA frame generator 1120 is the same as the UORA frame generator 520 described in FIG. 5. In the previous embodiments, a STA maintained a single UORAF 540 and a corresponding set of channel access parameters. The STA would contend for access to the medium through the single UORAF using the associated channel access parameters. If the UORAF wins the contention, the STA is allowed to transmit multiple frames on different RUs if the condition set by the AP is fulfilled.

As per the fourth embodiment, a STA may maintain multiple UORAFs 1140, 1150, 1160 etc. as well as their corresponding channel access parameters. The exact number of UORAFs that a STA maintains, n, may be decided by a standardization body such as the IEEE 802.11ax and be known to all complaint devices. Although the primary function of the UORA scheduler 1130 is to forward the frames to the UORAFs for channel access contention, due to the existence of multiple UORAFs, the stage 1 prioritization procedure at the UORA scheduler 1130 is slightly different as compared to that at the UORA scheduler 530. As an example, the IEEE 802.11ax specification may define the number of UORAFs that a STA maintains, n, to be equal to three.

Furthermore, as illustrated in table 1170 in FIG. 11B, the three UORAFs may be assigned three different priority levels: high priority 1172, normal priority 1174 or low priority 1176. Similarly, the frames that are to be forwarded to the three UORAFs may also be classified into the three priority levels as shown in the second column of table 1170. The frames may be classified according to the frame type as well as the STA's association state or power management mode such that the frames that are most suitable or most likely to be used during the uplink random access are assigned higher priority. For example, if the STA is in the power save power management mode then Buffer State report frame, PS-Poll frame and all frames from the AC_VO transmit queue 1110 are classified as high priority while the frames from the AC_VI transmit queue 1112 are classified as normal priority.

If the STA is in unassociated or disassociated state, then the authentication frame and association request frame are classified as high priority whereas probe request frame is classified as normal priority. If the STA is in associated state, then the collocated interference report frame is classified as high priority. If the STA is in active power management mode, then the Buffer State report frame as well as all frames from the AC_VO transmit queue 1110 are classified as normal priority. All other frame types in all other STA states/modes are classified as belonging to the low priority level. The frames classified as high priority, normal priority and low priority are forwarded by the UORA scheduler 1130 to UORAF 1140, UORAF 1150, and UORAF 1160 respectively. The classification illustrated here is just one example and many more such classifications are possible.

Referring to FIG. 11C, a table 1180 may also be defined that specifies the channel access parameters to be used for the various priority levels. At the very minimum, the table 1180 would specify the OCWmin and the OCWmax values to be used for each priority level 1182, 1184, and 1186. Since the minimum size of OCW, OCWmin, directly affects how fast a STA wins contention, the value of OCWmin is smaller for higher priority levels. Similarly, the maximum size of OCW, OCWmax, affects the number of retries that a STA may make for contention and also the maximum size of the contention window; in general OCWmax may also be smaller for the higher priority levels.

Additional parameters may also be defined, for example, transmission probability (PTX) which indicates the transmission probability of a STA that wins contention. PTX value of 1 indicates that the STA gets to transmit every time it wins contention where as PTX value of 0.5 indicates that the STA may only get to transmit 50% of the time it wins contention. Other parameters such as retransmission limit, i.e. the number of times a STA is allowed to retry for contention for the same frame etc. may also be defined.

As per the fourth embodiment, the AP may specify, in the Trigger frame, the maximum concurrent transmission that a STA may make. The actual number of concurrent transmissions that a STA can make, however, is the minimum value among the three factors: number of UORAFs, the number of frames of different priority levels ready for transmission and the value specified by the AP for the maximum concurrent transmission field. The AP may also specify a condition on some or all RUs, which determines the RUs that the STA is allowed to choose for transmission.

Depending on the implementation, the condition may represent the "response preference" encoding 710, or it may represent the Trigger type encoding 900, or it may also represent the Channel Condition encoding 1050. RUs that have conditions attached to them are known as Special RUs where as those without any conditions attached are known as Generic RUs. Upon receiving a valid Trigger frame, the UORA scheduler 1130 forwards one frame from each priority level to the corresponding UORAFs, as allowed according to the maximum concurrent transmission field 730, in order of the UORAF's priority, from high to low. Each of such UORAF contends for access to the wireless medium according to their respective channel access parameters such as the ones specified in the table 1180.

The UORAF that wins contention may choose the RU to transmit its frames as per the following rules:
If the frame to be transmitted meets the specified condition, it may randomly choose any one RU from the group of unused RUs (either Special RU or Generic RU).
If the frame to be transmitted does not meet the specified condition, it may randomly choose one RU only among the unused Generic RUs. Only one frame that does not meet the specified condition may be transmitted by the same STA in an uplink random access PPDU.
One RU may only be chosen once i.e. two different UORAFs may not choose the same RU. The first UORAF to win the contention gets to choose an RU first. If more than one UORAF wins contention at the same RU, the UORAF with higher priority gets to choose an RU first.

The multi-user frame exchange 1200 illustrated in FIG. 12 may be taken as an example of the fourth embodiment. In this example, the number of UORAFs that each STA maintain is fixed at three. The priority level classification and their corresponding channel access parameters are as illustrated in table 1170 and table 1180 in FIGS. 11B and 11C respectively. STA1 is operating in the power save power management mode and its transmit queues have at least one frame each from the three priority levels, a PS-Poll frame, an AC_VI data frame and an AC_BE data frame.

The AP broadcasts the Trigger frame 1210 which indicates RU1 1212 and RU5 1220 as Special RUs with a "response preference" of "0100" i.e. a PS-Poll frame, while RU2 1214, RU3 1216, and RU4 1218 are Generic RUs. All the RUs are assigned to AID X which represents a group of STAs: STA1, STA2, and STA3. The maximum concurrent transmission sub-field 730 is set to "10" i.e. 3. Only the UORA procedure at STA1 is considered in this example for the sake of brevity. Since the Trigger frame 1210 has RU allocation for STA1, the UORA scheduler 1130 forwards the PS-Poll frame to the high priority UORAF1, the AC_VI data frame to the normal priority UORAF2, and the AC_BE data frame to the low priority UORAF3. Each of the three UORAFs, UORAF1, UORAF2, and UORAF3 have their OBOs, OBO1, OBO2, and OBO3 randomly initialized to 3, 5 and 8 respectively.

As per the UORA procedure 200, all three OBOs get decremented by 1 in RU1, RU2, and RU3. At RU3, OBO1 is equal to 0, OBO2 is equal to 2 and OBO3 is equal to 5. Since UORAF1 has won the contention, and since UORAF1's frame happens to be a PS-Poll, it is allowed to randomly choose any one RU from RU1 1232, RU2 1234, RU3 1236, RU4 1238 or RU5 1240 for transmission in the multi-user PPDU 1230. In the example, STA1 randomly chooses the Special RU, RU1 1232 to transmit the PS-Poll frame. OBO2 and OBO3 continue to get decremented by 1 in RU4 and RU5 such that OBO2 reaches 0 in RU5 while OBO3 is equal to 3 in RU5. Since UORAF2 has won the contention in RU5 and the frame in UORAF2 happens to be a data frames. Since data frames do not qualify to be transmitted on the Special RUs, UORAF2 randomly chooses one of the Generic RUs, RU4 1238 for transmission of the data frame.

Even though the STA is allowed to transmit up to 3 frames, since UORAF3 did not win the contention, the UORA process has to be terminated. But even if UORAF3 had won contention at RU5, it would not be allowed to transmit its data frame since only one frame that does not meet the specified condition is allowed to transmit per STA. Finally, STA1 constructs the uplink multi-user PPDU 1230 with a common PHY header and the two frames filling the data portions of the PPDU, the PS-Poll frame on RU1, and the data frame on RU4 respectively and finally transmits the multi-user PPDU 1230 to the AP. Regardless of whether or not the UORAFs of STA2 and STA3 manage to win contention, it can be seen that as compared to the example in FIG. 3, since STA1 is allowed to transmit multiple frames on multiple RUs as per the present disclosure, STA1 enjoys a higher priority in this example.

Since each UORAF contends for the medium based on its own channel access parameters, the probability of the higher priority UORAFs winning the contention is higher. Also, since each UORAF contends for the medium independent of the other UORAFs, even though one STA is allowed multiple transmission opportunities, not all eligible UORAFs may win the contention and hence the collision rate for the fourth embodiment would be lesser as compared to the previous three embodiments.

Fifth Embodiment

The previous embodiments assigned higher priority by allowing the eligible STAs to access more resource units during the random access. A fifth embodiment assigns higher priority by allowing eligible STAs faster access to the medium during the random access.

As per the fifth embodiment of the present disclosure, the AP reserves some of the allocated RUs for use by eligible STAs by advertising a condition for those RUs in the Trigger frame. The UORA procedure is modified such that the STAs that meet the condition have higher probability of winning the UORA contention faster than other STAs. The RUs in which the indicated condition applies may be referred to as Special RUs, whereas the RUs in which the indicated condition does not apply may be referred to as Generic RUs. Since the Generic RUs do not have any conditions attached to them, all STAs are considered eligible to transmit on them whereas only STAs that can meet the specified conditions attached to the Special RUs are eligible to transmit on them. During the UORA process, the OBO of eligible STAs i.e. STAs which meets the condition specified on a RU gets decremented by a value that is greater than the value by which the OBO of a STA which does not meet the condition gets decremented.

Figure 13:
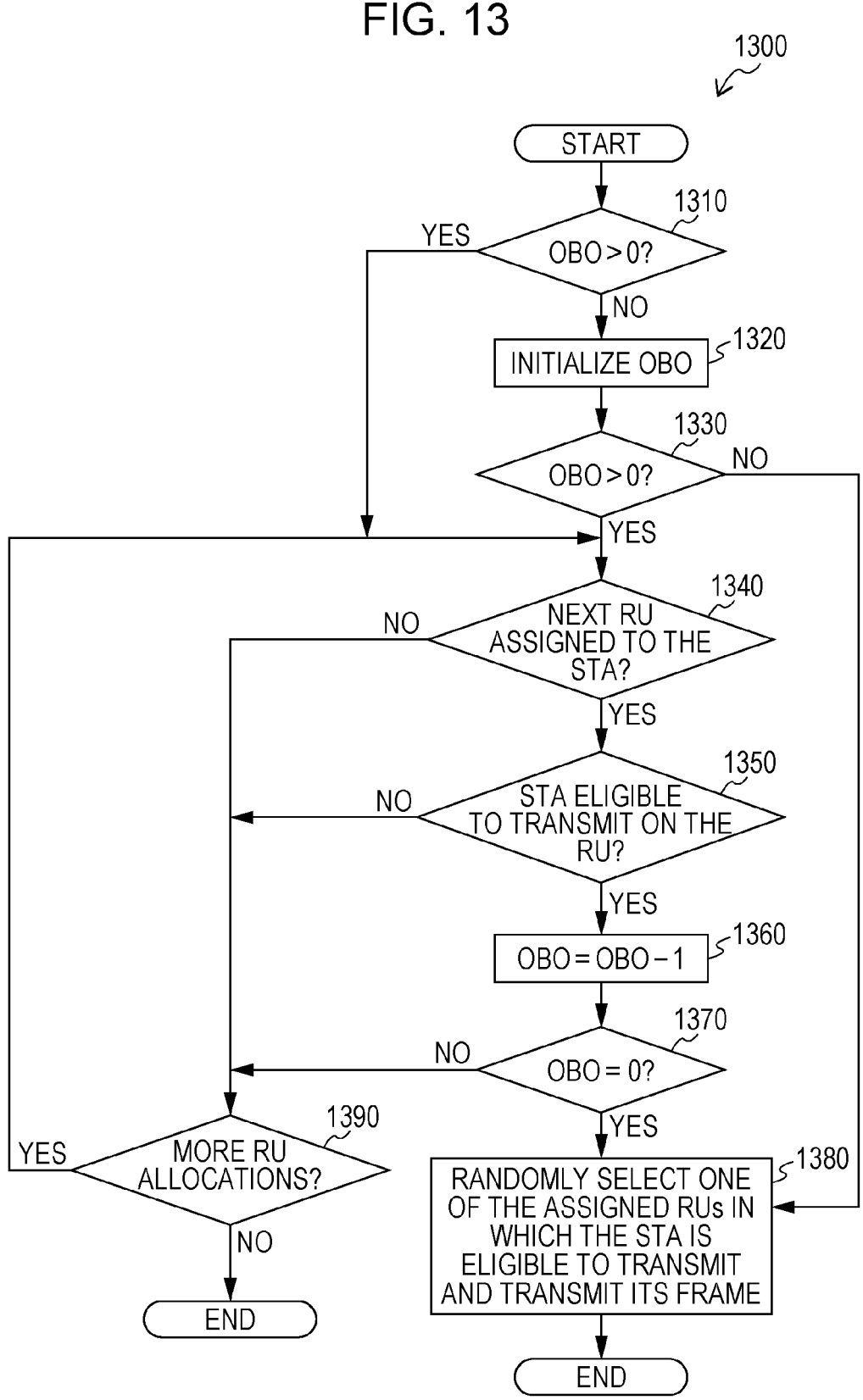
FIG. 13 is a flow chart of a fifth embodiment of the proposed prioritized multi-user random access.

The modified UORA process at a STA can be better explained with the aid of flow chart 1300 in FIG. 13. The modified UORA process starts when the STA receives a Trigger frame from an AP and determines that at least one RU has been allocated to the STA. If this is the first instance of the modified UORA process being invoked, or if the STA was successful in winning contention at the previous UORA period, its OBO will be equal to 0.

At step 1310, whether the OBO value is greater than 0 is determined. If the OBO value is greater than 0, the process directly jumps to step 1340 but if OBO value is equal to 0, the process is passed to step 1320 where the OBO value is initialized to a random value between 0 and OCW and the process is passed to step 1330. At step 1330, whether the OBO value is greater than 0 is determined again. If the OBO value is greater than 0, the process is passed to 1340, but if OBO value is equal to 0, the process directly jumps to step 1380. At step 1340, starting from the first RU allocation in the Trigger frame, it is checked if the RU is allocated to the STA. If it is, the process is passed to step 1350, else the process is passed to step 1390.

At step 1350, the STA checks if it is eligible to transmit on the RU based on the condition specified for the RU if any; if it is the process is passed to step 1360, else the process is passed to step 1390. At step 1360, OBO value is decremented by 1 and process is passed to 1370 where whether the OBO value is equal to 0 is determined again and if it is 0, process is passed to step 1380, else the process is passed to step 1390. At step 1380, the STA is considered to have won the contention right, and it randomly selects one RU among the RUs allocated for the STA in which the STA is eligible to transmit, and transmits its frame and the modified UORA process ends. At step 1390, the Trigger frame is checked if more RU allocation field exist. If more RU allocation field exist, the modified UORA process continues and the process jumps back to step 1340 else the modified UORA process ends.

Figure 14:
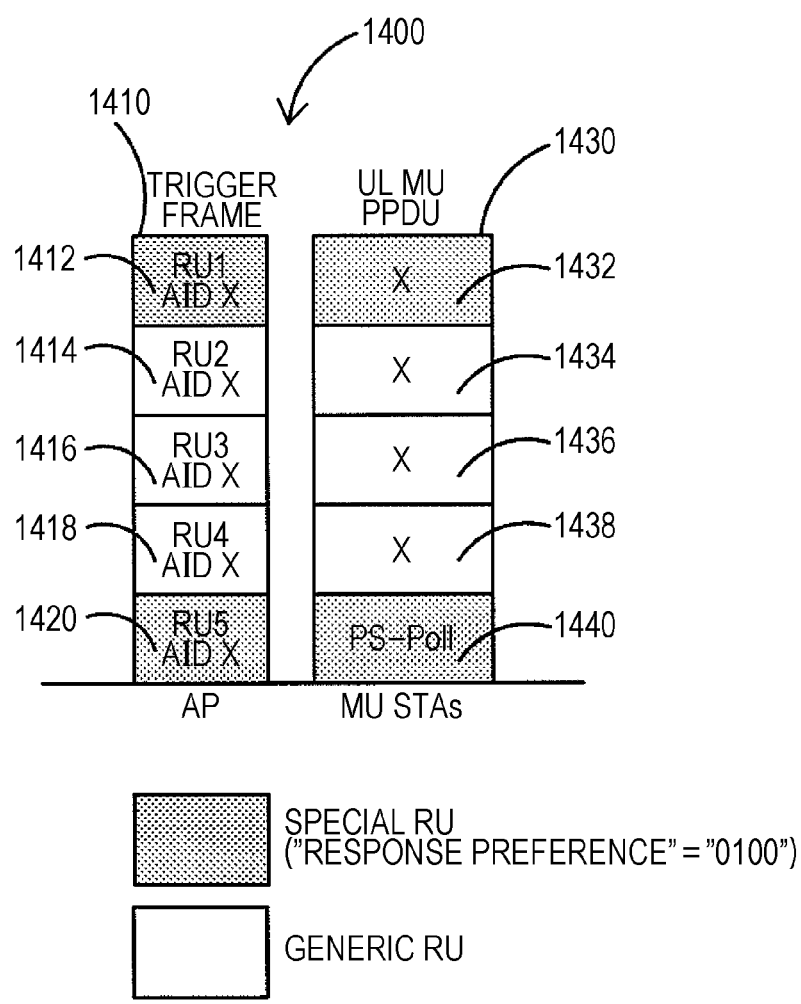
FIG. 14 is a diagram of an example multi-user frame exchange as per the fifth embodiment of the proposed prioritized multi-user random access.

In the example illustrated in FIG. 14, the AP broadcasts a Trigger frame 1410 which indicates RU1 1412 and RU5 1420 as Special RUs with a "response preference" of "0100" i.e. a PS-Poll frame, while RU2 1414, RU3 1416, and RU4 1418 are Generic RUs. All the RUs are assigned to AID X which represents a group of STAs: STA1 and STA2. The next frame in the transmit queue of STA1 is a PS-Poll frame while that in STA2 is a data frame. Since the Trigger frame has RU allocation for both STA1 and STA2, each device's OBO is randomly initialized to 5 and 4 respectively.

As per the modified UORA procedure 1300 of FIG. 13, the OBO of STA1 gets decremented by 1 in the Special RU, RU1, while STA2's OBO is not decremented. OBOs of both STA1 and STA2 are decremented by 1 in each of Generic RUs, RU2, RU3, and RU4. At RU4, both STAs' OBOs are equal to 1. Proceeding to RU5, again since RU5 is a Special RU, only STA1's OBO gets decremented by 1 and reaches the value of 0. Since STA1 has won the contention, it is allowed to randomly choose any one RU from RU1 1432, RU2 1434, RU3 1436, RU4 1438 or RU5 1440 for transmission in the multi-user PPDU 1430. In the example, STA1 randomly chooses the Special RU, RU5 1440 to transmit the PS-Poll frame. It can be seen that as compared to the example in FIG. 3, since only STA1 is allowed to decrement it's OBO in RU1 and RU5 as per the present embodiment, STA1 enjoys a higher priority i.e. faster access to the medium. Even though OBO of STA1 was initialized to a higher value (5) as compared to that of STA2 (4), STA1 still managed to win the contention ahead of STA2.

Other variations of the fifth embodiment are also possible for example the OBO of eligible STAs gets decremented by two (2) while the OBO of a STA which does not meet the condition gets decremented by one (1).

Radio Communication System

Figure 15:
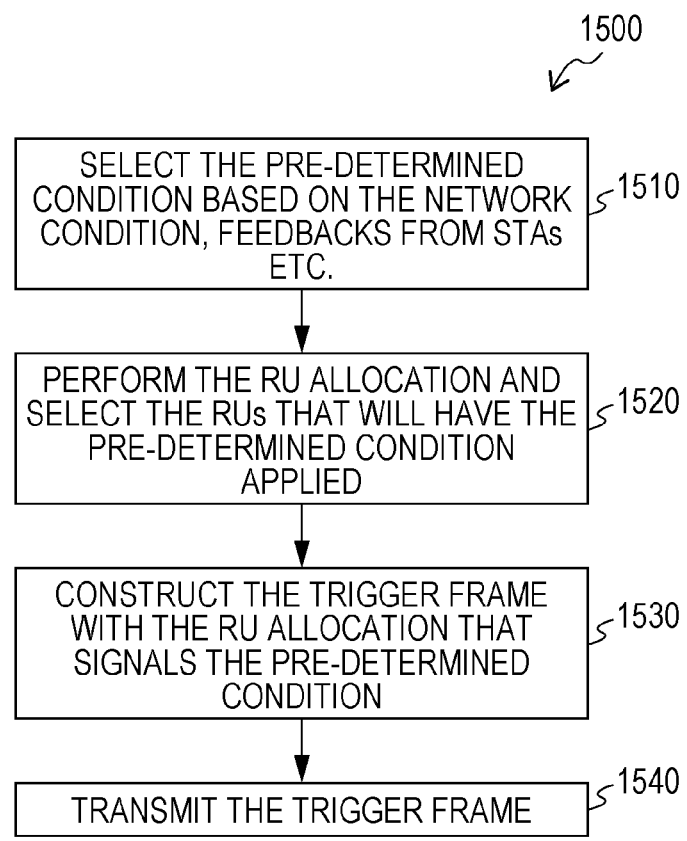
FIG. 15 is a block diagram of an example STA.

FIG. 15 illustrates an example method 1500 to be implemented by an AP for the advertisement, in the Trigger frame, of the condition that is used to provide differentiated priorities to the STAs taking part in the Uplink OFDMA Random Access. At 1510, based on the AP's observations regarding the current network conditions which may also include feedbacks from STAs etc., the AP selects the most appropriate condition that is to be used in the Trigger frame. Depending on the implementation, the condition may represent the "response preference" encoding 710, or it may represent the Trigger type encoding 900, or it may also represent the Channel Condition encoding 1050. At 1520, the AP performs the RU allocation and also selects the RUs that will have the conditions applied to them. At 1530, the AP constructs the Trigger frame that includes the RU allocation along with the bit encoding identifying the RUs with the condition. Finally, at 1540, the AP transmits the Trigger frame.

Figure 16:
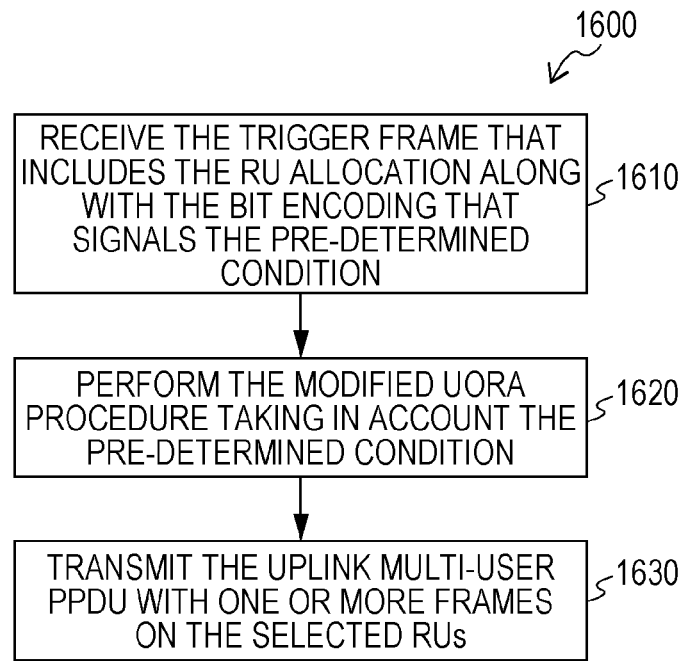
FIG. 16 is a block diagram of an example AP.

FIG. 16 illustrates an example method 1600 to be implemented by a STA that makes use of the modified Uplink OFDMA Random Access. At 1610, the STA receives the Trigger frame from the AP and decodes the RU allocation as well as the condition attached to the RUs. Depending on the implementation, the condition may represent the "response preference" encoding 710, or it may represent the Trigger type encoding 900, or it may also represent the Channel Condition encoding 1050. At 1620, if the Trigger frame has RU allocation for the STA, it contends for the wireless medium based on the modified UORA procedure. The modified UORA procedure may refer to any of the various UORA procedures explained in the different embodiments of the present disclosure. At 1630, if the STA manages to win the contention, it transmits one or more frames on the selected RUs of the uplink multi-user PPDU, based on the conditions signaled in the Trigger frame.

Configuration of a STA

Figure 17:
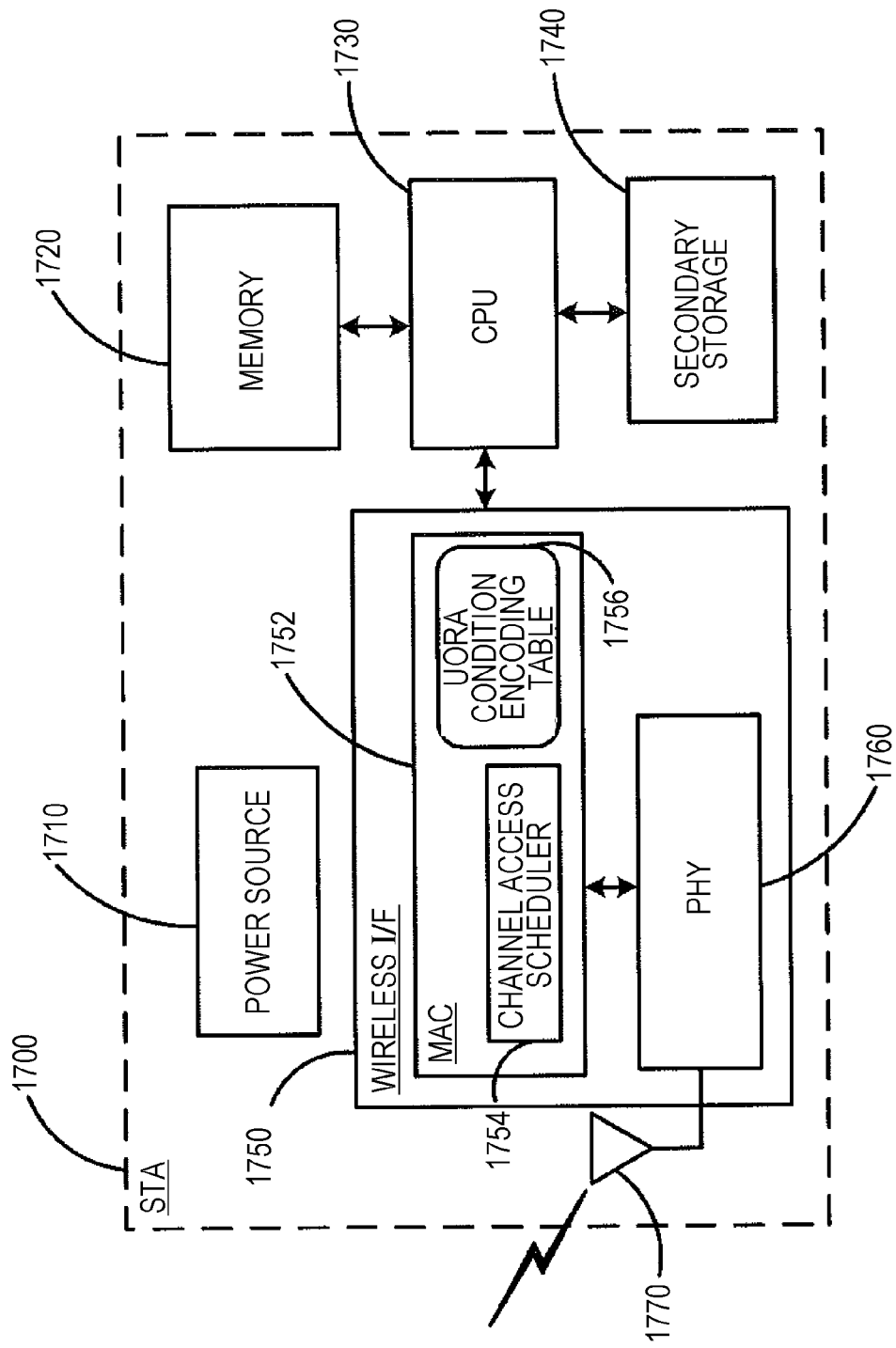
FIG. 17 is a block diagram of an example STA.

FIG. 17 is a block diagram of an example STA 1700, which may be any one of the STAs in FIG. 1. The STA 1700 comprises a Central Processing Unit (CPU) 1730 coupled to a memory 1720, a secondary storage 1740 and to one or more wireless communication interfaces 1750. The secondary storage 1740 may be a non-volatile computer readable storage medium that is used to permanently store pertinent instruction codes, data etc. At the time of start up, the CPU 1730 may copy the instruction codes as well as related data to the volatile memory 1720 for execution. The instruction code may be an operating system, user applications, device drivers, execution codes etc. which are required for the operation of the STA 1700. The STA 1700 may also comprise a power source 1710, for example, a lithium ion battery or a coin cell battery etc.

The wireless communication interface 1750 may comprise an interface for cellular communication, or an interface for short range communication protocols such as Zigbee, or it may be a WLAN interface. The Wireless interface 1750 may further comprise a MAC module 1752 and a PHY module 1760. Among other sub-modules, the MAC module 1752 may comprise a channel access scheduler 1754 which is responsible for scheduling access to the wireless medium. The MAC module 1752 may also store a table 1756 of the bit encoding used to represent the UORA condition. The PHY module is responsible for the conversion of the MAC module data to/from the transmission/reception signals. The wireless interface may also be coupled, via the PHY module, to one or more antennas 1770 that are responsible for the actual transmission/reception of the wireless communication signals on/from the wireless medium.

In a particular embodiment, the operating system comprises a Real Time Operating System (RTOS), the user application comprise a web browser or a smartphone app, device drivers comprises a WLAN driver and the execution code may comprise code which when executed by the CPU 1730, causes the method 1600 to be executed. The Channel Access scheduler 1754 implements the reference model 400 where the UORA procedure is used in conjunction with the EDCA mechanism. Depending on the implementation, the UORA condition encoding table 1756 may represent the "response preference" encoding 710, or it may represent the Trigger type encoding 900, or it may also represent the Channel Condition encoding 1050. The UORA condition encoding table 1756 may be stored with default values during manufacturing. It is also possible that the UORA condition encoding table 1756 be updated according to the values communicated by the AP during the association process, or based on the values advertised regularly by the AP in periodic frames such as beacon frames.

STA 1700 may comprise many other components that are not illustrated, for sake of clarity, in FIG. 17. Only those components that are most pertinent to the present disclosure are illustrated.

Configuration of an Access Point

Figure 18:
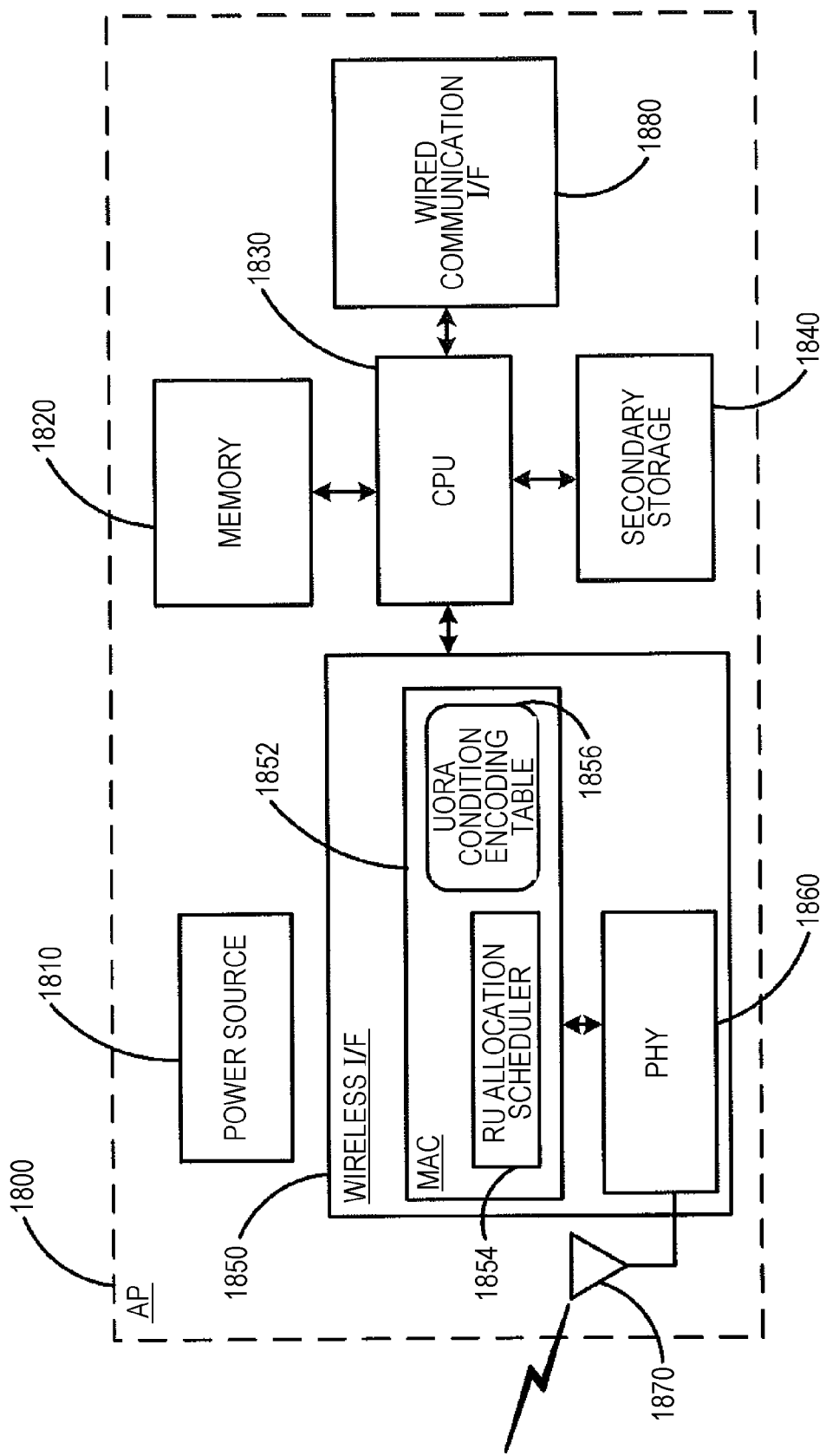
FIG. 18 is a block diagram of an example AP.

FIG. 18 is a block diagram of an example AP 1800, which may be the AP 190 in FIG. 1. The AP 1800 comprises a Central Processing Unit (CPU) 1830 coupled to a memory 1820, a secondary storage 1840, to one or more wireless communication interfaces 1850, as well as to other wired communication interfaces 1880. The secondary storage 1840 may be a non-volatile computer readable storage medium that is used to permanently store pertinent instruction codes, data etc. At the time of start up, the CPU 1830 may copy the instruction codes as well as related data to the volatile memory 1820 for execution. The instruction code may be an operating system, user applications, device drivers, execution codes etc. which are required for the operation of the AP 1800. The size of the instruction code and hence the storage capacity of both the secondary storage 1840 as well as the memory 1820 may be substantially bigger than that of the STA 1700. The STA 1800 may also comprise a power source 1810 which in most cases may be a power mains but in some cases may also be some kind of high capacity battery, for example, a car battery. The wired communication interface 1880 may be an Ethernet interface, or a powerline interface, or a telephone line interface etc.

The wireless communication interface 1850 may comprise an interface for cellular communication, or an interface for short range communication protocols such as Zigbee, or it may be a WLAN interface. The Wireless interface 1850 may further comprise a MAC module 1852 and a PHY module 1860. The MAC module 1852 of an AP may be substantially more complicated than that of a STA 1700 and may comprise many sub-modules. Among other sub-modules, the MAC module 1852 may comprise a RU allocation scheduler 1854 which is responsible for performing step 1520 of the method 1500. The MAC module 1852 may also store a table 1856 of the bit encoding used to represent the UORA condition. The PHY module is responsible for the conversion of the MAC module data to/from the transmission/reception signals. The wireless interface may also be coupled, via the PHY module, to one or more antennas 1870 that are responsible for the actual transmission/reception of the wireless communication signals on/from the wireless medium.

In a particular embodiment, the operating system comprises a Real Time Operating System (RTOS), the user application comprise a web browser or a smartphone app, device drivers comprises a WLAN driver and the execution code may comprise code which when executed by the CPU 1830, causes the method 1500 of FIG. 15 to be executed.

Depending on the implementation, the UORA condition encoding table 1856 may represent the "response preference" encoding 710, or it may represent the Trigger type encoding 900, or it may also represent the Channel Condition encoding 1050. The UORA condition encoding table 1856 may be stored with default values during manufacturing but the AP 1800 may also tweak these if required according to the prevailing network conditions and communicate the new table contents to the member STAs, for example, during the association process, or the AP 1800 may also choose to advertise the new table contents in an information element in some periodic frames such as beacon frames.

AP 1800 may comprise many other components that are not illustrated, for sake of clarity, in FIG. 18. Only those components that are most pertinent to the present disclosure are illustrated.

In the foregoing embodiments, the present disclosure is configured with hardware by way of example, but may also be provided by software in cooperation with hardware.

In addition, the functional blocks used in the descriptions of the embodiments are typically implemented as LSI devices, which are integrated circuits. The functional blocks may be formed as individual chips, or a part or all of the functional blocks may be integrated into a single chip. The term "LSI" is used herein, but the terms "IC," "system LSI," "super LSI" or "ultra LSI" may be used as well depending on the level of integration.

In addition, the circuit integration is not limited to LSI and may be achieved by dedicated circuitry or a general-purpose processor other than an LSI. After fabrication of LSI, a field programmable gate array (FPGA), which is programmable, or a reconfigurable processor which allows reconfiguration of connections and settings of circuit cells in LSI may be used.

Should a circuit integration technology replacing LSI appear as a result of advancements in semiconductor technology or other technologies derived from the technology, the functional blocks could be integrated using such a technology. Another possibility is the application of biotechnology and/or the like.

This disclosure can be applied to a method for prioritization of devices taking part in a multi-user random access wireless communication.

What is claimed is:

1. A station, comprising:

an antenna, which, in operation, receives a trigger frame including a common information field and a plurality of user information fields, the common information field including a trigger type subfield that identifies a trigger type of the trigger frame, wherein several trigger types allow allocation of resource units (RUs) for uplink OFDMA random access (UORA), and one user information field of the plurality of user information fields includes an association identification (AID) subfield, wherein the AID subfield with a defined value indicates that the one user information field allocates one or more RUs for UORA; and circuitry, which, in operation, decodes the received trigger frame.

2. The station according to claim 1, wherein the trigger type subfield is a four-bit subfield in the common information field of the trigger frame, wherein sixteen possible values are configured for the trigger type subfield and some of the sixteen possible values allow allocation of RUs for UORA.

3. The station according to claim 1, wherein a condition for allocating RUs for UORA is implicitly indicated by the trigger type subfield in the common information field of the trigger frame.

4. The station according to claim 1, wherein the several trigger types of the trigger frame include a Basic trigger and a Buffer Status Report trigger.

5. The station according to claim 1, wherein the several trigger types of the trigger frame include a trigger that solicits transmission of an interference report based on an interference level at the station.

6. The station according to claim 1, wherein the trigger frame includes a preference subfield that indicates a preferred access category (AC) of a response.

7. A communication method for a station, the communication method comprising:

receiving a trigger frame including a common information field and a plurality of user information fields, the common information field including a trigger type subfield that identifies a trigger type of the trigger frame, wherein several trigger types allow allocation of resource units (RUs) for uplink OFDMA random access (UORA), and one user information field of the plurality of user information fields includes an association identification (AID) subfield, wherein the AID subfield with a defined value indicates that the one user information field allocates one or more RUs for UORA; and decoding the received trigger frame.

* * * * *